United States Patent
He et al.

(10) Patent No.: US 9,141,249 B2
(45) Date of Patent: Sep. 22, 2015

(54) RESISTIVE TOUCH SCREEN, AND DOUBLE-POINT DETECTION PROCESSING METHOD AND DEVICE THEREOF

(75) Inventors: Yiyue He, Shanghai (CN); Fengjuan Zhao, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/127,833

(22) PCT Filed: Apr. 6, 2012

(86) PCT No.: PCT/CN2012/073561
§ 371 (c)(1),
(2), (4) Date: Dec. 19, 2013

(87) PCT Pub. No.: WO2013/149393
PCT Pub. Date: Oct. 10, 2013

(65) Prior Publication Data
US 2015/0015533 A1 Jan. 15, 2015

(51) Int. Cl.
*G06F 3/045* (2006.01)
*G06F 3/041* (2006.01)

(52) U.S. Cl.
CPC .............. *G06F 3/045* (2013.01); *G06F 3/0416* (2013.01); *G06F 2203/04104* (2013.01)

(58) Field of Classification Search
CPC ............... G06F 3/045; G06F 3/04883; G06F 2203/04807; G06F 3/041
USPC ..................... 345/173–175; 178/18.01–18.06
See application file for complete search history.

(56) References Cited

U.S. PATENT DOCUMENTS

| | | | |
|---|---|---|---|
| 8,363,020 B2* | 1/2013 | Li et al. | 345/173 |
| 2009/0189877 A1* | 7/2009 | Washino et al. | 345/174 |
| 2011/0025642 A1* | 2/2011 | Tada et al. | 345/174 |
| 2011/0193819 A1* | 8/2011 | Sherman | 345/174 |
| 2012/0075235 A1* | 3/2012 | Hong et al. | 345/174 |

FOREIGN PATENT DOCUMENTS

| | | |
|---|---|---|
| CN | 20126637 | 8/2008 |
| CN | 201293985 Y | 8/2008 |
| CN | 102033674 A | 9/2009 |
| WO | WO2013/149393 | 10/2013 |

OTHER PUBLICATIONS

International Search Report for PCT/CN2012/073561 6 pages (English).

* cited by examiner

*Primary Examiner* — Pegeman Karimi
(74) *Attorney, Agent, or Firm* — Lackenbach Siegel LLP; Myron Greenspan

(57) ABSTRACT

Disclosed are a resistive touch screen, and a double-point detection processing method and device thereof. A screen body of the resistive touch screen comprises a first conducting layer panel and a second conducting layer panel. An X axis formed by two electrical connection ends on the first conducting layer panel is in series connection with a first test resistor, and a Y axis formed by two electrical connection ends on the second conducting layer panel is in series connection with a second test resistor. If point touch exists on the resistive touch screen, a first voltage value at an end of the test resistor and a second voltage value at an end of the second test resistor are acquired. Embodiments of the present invention can implement double-point touch detection on the resistive touch screen.

25 Claims, 12 Drawing Sheets

|   | XIY0 |   |   |
|---|---|---|---|
| TBD | TBD | | TBD |
| XOYI | TBD | TBD | TBD | XOYI |
| TBD | TBD | | TBD |
|   | XIY0 |   |   |

RESISTIVE TOUCH SCREEN, AND DOUBLE-POINT DETECTION PROCESSING METHOD AND DEVICE THEREOF

CROSS REFERENCE TO RELATED APPLICATIONS

This application relates to and claims priority from PCT App. Ser. No. PCT/CN2012/073561 filed on Apr. 6, 2012, the entire contents of which are incorporated herein by reference.

TECHNICAL FIELD

The present invention is related to the display technique, especially a resistive touch screen and its double-point detection processing method and device thereof.

BACKGROUND OF THE INVENTION

The touch screen technology has been widely used in man-computer interaction. Compared to the capacitive touch screen, the resistive touch screen is widely used in various devices due to the characteristics of the simple structure, the low cost, the good stability and so on. The screen body of the resistive touch screen is made by a layer of glass or organic glass as a basic layer, and the external surface of the basic layer is coated with a transparent conducting layer, then the conducting layer is covered with a plastic layer with a hardened, smooth and scratch-resistant external surface. The inner surface of the basic layer is also coated with a transparent conducting layer. For the convenience of presentation, the conducting layer of the inner surface and external surface of the basic layer are called the first conducting layer panel and the second conducting layer panel respectively. There are a plurality of small and transparent isolation point between the first conducting layer panel and the second conducting layer panel to separate thereby. There is an insulation between the first conducting layer panel and the second conducting layer panel. FIG. 1 shows the single-point touching diagram of the resistive touch screen, wherein XL, XR, YU, YD are electrical connection ends which could connect the first conducting layer panel of the resistive touch screen to the Y conducting layer. XL and XR jointly form the X axis of a coordinates which sets on the surface screen of the resistive touch screen, and YU and YD form the Y axis of this coordinates.

The user touches the screen of the touch screen by finger. When the pressure on the screen of the resistive touch screen is big enough, the first conducting layer panel and the second conducting layer panel contact at Touching Point P and then conduct the current. FIG. 2 shows the equivalent circuit diagram of the resistive touch screen shown by FIG. 1. Referring to FIGS. 1 and 2, Rxl and Rxr represent the two parts of the equivalent resistor of the first conducting layer panel divided by Touching Point P. Yyu and Yyd represent the two parts of the equivalent resistor of the second conducting layer panel divided by Touching Point P. Rz represents the touch resistance at Touching Point P of the first conducting layer panel and the second conducting layer panel.

In specific applications, the total resistance of the first conducting layer panel and the second conducting layer panel is known. Based on the proportional relationship between the voltage and the resistance, if YU is connected to the positive voltage as reference voltage, and YD is grounded, it gets the voltage digital signal Vadcx of a test point X which is in the XR side by sampling the voltage and performing analog-to-digital conversion by an analog to digital converter ("ADC", hereafter), and it obtains the voltage value of Touching Point P on the first conducting layer panel; Likewise, if XL is connected to the positive voltage as reference voltage, and XR is grounded, it gets the voltage digital signal Vadcy of a test point X which is in the XR side by sampling the voltage and performing analog-to-digital conversion by ADC, and it obtains the voltage value of Touching Point P on the Y conducting layer panel. As the resistance of the first conducting layer panel and the second conducting layer panel is in the uniform level, the X position and Y position of Touching Point P can be obtained according to the Vadcx and Vadcy.

However, in the process of realizing the present invention, the applicant found that the prior art exists at least the following problems:

As single-point touching just generates a single voltage value to each axis on the resistive touch screen, it can accurately identify the position of the touching point. If there is a second touching point on the resistive touch screen, there will be two voltage values in each axis. These two voltage value can be generated by double-point touching which are on different positions. At that moment, the resistive touch screen can not get the position of the two touching points accurately. Therefore, it can only realize the single-point touching detection on the resistive touch screen based on the prior art, while it can not provide a double-point touching detection for the resistive touch screen, thus it limits the application of the resistive touch screen.

SUMMARY OF THE INVENTION

The technical problems to be solved by the embodiments of the present invention are: through providing a resistive touch screen and the double-point detection processing method and device thereof to realize the detection of double-point touching on the resistive touch screens.

According to an aspect of an embodiment of the present invention, a double-point detection processing method for resistive touch screen is provided. The screen body of the resistive touch screen includes a first conducting layer panel and a second conducting layer panel, two electrical connection ends on the first conducting layer panel form an X axis of a coordinates which sets on the surface of the resistive touch screen, two electrical connection ends on the second conducting layer panel form a Y axis of the coordinates; a first test resistor Rx is set in series on the X axis, and a second test resistor Ry is set in series on the Y axis; the method includes:

responding to the point touch existing on the resistive touch screen, acquiring a first voltage value Vadcx of the first test resistor Rx and a second voltage value Vadcy of the second test resistor Ry;

identifying whether the status of the resistive touch screen is single-point touching or double-point touching according to the magnitude relationship between the first voltage value Vadcx and a first reference voltage value Vadcx_ref, and the magnitude relationship between the second voltage value Vadcy and a second reference voltage value Vadcy_ref; wherein the first reference voltage value Vadcx_ref is the voltage value of the first test resistor Rx when performing single-point touching on the resistive touch screen and generating a electric field on the X axis; the second reference voltage value Vadcy_ref is the voltage value of the second test resistor Ry when performing single-point touching on the resistive touch screen and adding generating a electric field on the Y axis;

responding to the status of the resistive touch screen which is double-point touching, identifying the operation gesture according to the magnitude change trend of the first voltage value Vadcx and the second voltage value Vadcy in the double-point touching process, the operation gesture of double-point touching includes gesture with no relative motion between double-point, magnification gesture, shrink gesture and rotation gestures.

According to another aspect of an embodiment of the present invention, a double-point detection device for resistive touch screen is provided, the screen body of the resistive touch screen includes a first conducting layer panel and a second conducting layer panel, two electrical connection ends on the first conducting layer panel form an X axis of a coordinates which sets on the surface screen of the resistive touch screen, two electrical connection ends on the second conducting layer panel form a Y axis of the coordinates; wherein a first test resistor Rx is connected in series on the X axis, and a second test resistor Ry is connected in series on the Y axis, the device includes:

a first obtaining unit, which is used for obtaining a first voltage value Vadcx of a first test resistor Rx and a second voltage value Vadcy of a second test resistor Ry in response to point touch existing on the resistive touch screen;

a first identifying unit, which is used for identifying whether the status of the resistive touch screen is single-point touching or double-point touching according to the magnitude relationship between the first voltage value Vadcx and a first reference voltage value Vadcx_ref, and according to the magnitude relationship between the second voltage value Vadcy and a second reference voltage value Vadcy_ref; wherein the first reference voltage value Vadcx_ref is the voltage value of the first test resistor Rx when performing single-point touching on the resistive touch screen and generating a electric field on the X axis; the second reference voltage value Vadcy_ref is the voltage value of the second test resistor Ry when performing single-point touching on the resistive touch screen and generating a electric field on the Y axis;

a second identifying unit, which is used for identifying the operation gesture according to the magnitude change trends of the first voltage value Vadcx and the second voltage value Vadcy in the double-point touching process, the operation gesture of double-point touching includes gesture with no relative motion between double-point, magnification gesture, shrink gesture and rotation gestures in response to the status of the resistive touch screen which is double-point touching according to the recognition result of the first identifying unit.

According to another aspect of an embodiment of the present invention, a resistive touch screen is provided, the screen body of the resistive touch screen includes a first conducting layer panel and a second layer panel, two electrical connection ends on the first conducting layer panel form an X axis of a coordinates which sets on the surface of the resistive touch screen, two electrical connection ends on the second conducting layer panel form a Y axis of the coordinates; wherein a first test resistor Rx is connected in series on the X axis, and a second test resistor Ry is connected in series on the Y axis; the resistive touch screen includes the double-point detection device of the resistive touch screen provided by the above mentioned embodiments of the present invention.

Based on the resistive touch screen and its double-point detection processing method and device thereof provided by the present invention, a first test resistor Rx is connected in series on the X axis on the screen body of the resistive touch screen and the second test resistor Ry is connected in series on the Y axis. Meanwhile, a first reference voltage values Vadcx_ref of the first test resistor Rx side and a second reference voltage value Vadcy_ref of the second test resistor Ry side are obtained in advance when the single-point touching is performed. When there is a point touch on the resistive touch screen, a first voltage value Vadcx of the first test resistor Rx and a second voltage value Vadcy of the second test resistor Ry are obtained. The voltage value on the same test point will change because the first test resistor Rx is connected in series on the X axis and the second test resistor Ry is connected in series on the Y axis. Therefore, according to the magnitude relationship between the first voltage value Vadcx and the first reference voltage value Vadcx_ref, and according to the magnitude relationship between the second voltage value Vadcy and the second reference voltage value Vadcy_ref, it is available to identify whether the status of the resistive touch screen is single-point touching or double-point touching. If the status of the resistive touch screen is double-point touching, the operation gesture will be identified according to the magnitude change trend of the first voltage value Vadcx and the second voltage value Vadcy in the double-point touching process. For example, the operation gesture of double-point touching may include gesture with no relative motion between double-point, magnification gesture, shrink gesture and rotation gestures and so on. Thereby the double-point detection of the resistive touch screen is realized, the limitation of the application that the resistive touch screen can only detect single-point touching application is broken, the software applications of the resistive touch screen is enriched and the user experience is enhanced. Since the great difference between the resistive touch screen and capacitive touch screen in price, the embodiments of the invention can effectively promote the application of the resistive touch screen, which will extend the application range of the resistive touch screen and make the embodiment of the invention possess a certain practical value and significance.

The following context will make further description for the technical proposal of the present invention in conjunction with appended drawings and embodiments.

BRIEF DESCRIPTIONS OF THE DRAWINGS

In order to describe the embodiments of the present invention and the related arts in details, the drawings to be used in combination of the embodiments and related arts for description will be briefly introduced in the following context. Obviously, the drawings described as follows are only some example and embodiments of the present invention and it is available to achieve other equivalent drawings for the skilled in the art without making any inventive work.

FIGS. 7a and 7b show the flow diagram of another embodiment of the double-point detection processing method for resistive touch screen of the present invention, FIG. 7b being a continuation of the flow diagram shown in FIG. 7a;

DESCRIPTIONS OF THE PREFERRED EMBODIMENT

The present invention will be further illustrated in combination with the drawings and embodiments. Obviously, the described embodiments are only part of the available embodiments for the present invention instead of all the embodiments. It should be appreciated that according to the embodiments in the present invention, the other equivalent embodiments which may be achieved by the skilled in the art without making any inventive work should also fall into the scope of the present invention.

In the various embodiments of the present invention, the screen body of the resistive touch screen includes a first conducting layer panel and a second conducting layer panel. Wherein, two electrical connection ends on the first conducting layer panel form an X axis of a coordinates on the surface screen of the resistive touch screen, and two electrical connection ends on the second conducting layer panel form a Y axis of the coordinates. A first test resistor Rx is connected in series on the X axis and a second test resistor Ry is connected in series on the Y axis in order to obtain the change of resistance value of the equivalent resistor on the X axis and Y axis. The resistance value of the first test resistor Rx and the second test resistor Ry are preferred to be chosen as which can show the change of the resistance value of the equivalent resistor of X axis and Y axis of the screen body. The inventors of the present invention found that it could reveal the change of resistance value of the X axis well when the difference between the resistance value of the first test resistor Rx and the equivalent resistor of the X axis on the screen body is small, and it could reveal the change of resistance value of the Y axis well when the difference between the resistance value of the first test resistor Ry and the equivalent resistor of the Y axis on the screen body is small. It can reveal the change of the resistance value of the X axis equivalent resistor best when the resistance value of the first test resistor Rx equals to the resistance value of the X axis equivalent resistor of the screen body. It can reveal the change of the resistance value of the Y axis equivalent resistor best when the resistance value of the first test resistor Ry equals to the resistance value of the Y axis equivalent resistor of the screen body. Therefore, in the preferred embodiment of the present invention, the resistance value of the first test resistor Rx can be same as the resistance value of the equivalent resistor of the X axis on the screen body, and the resistance value of the second test resistor Ry can be same as the resistance value of the equivalent resistor of the Y axis on the screen body. For example, in accordance with the product parameters of the existing resistive touch screen, the resistance value of the first test resistor Rx and the second test resistor Ry are usually in the range of 200 ohms-300 ohms.

Figure 1:
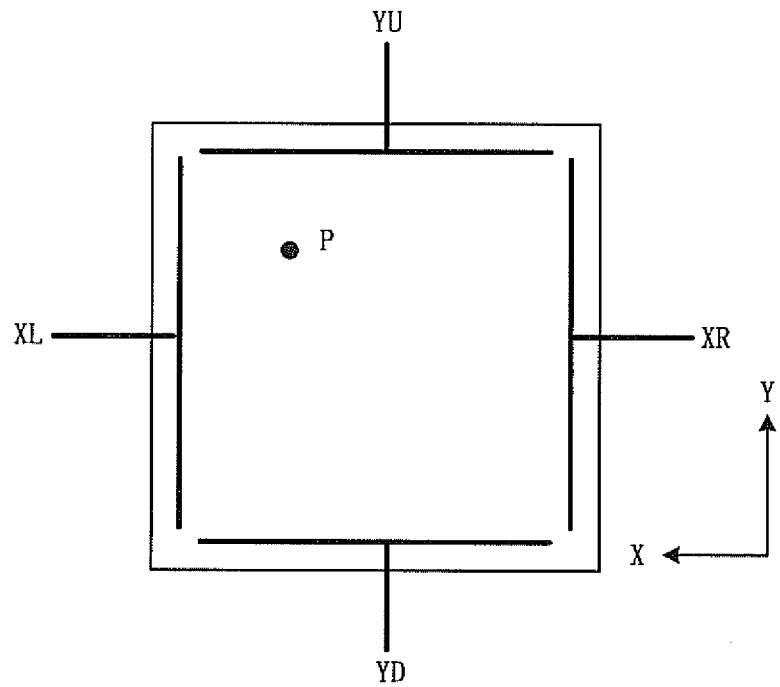
FIG. 1 shows a schematic diagram of the single-point touching screen on the resistive touch screen.
Figure 2:
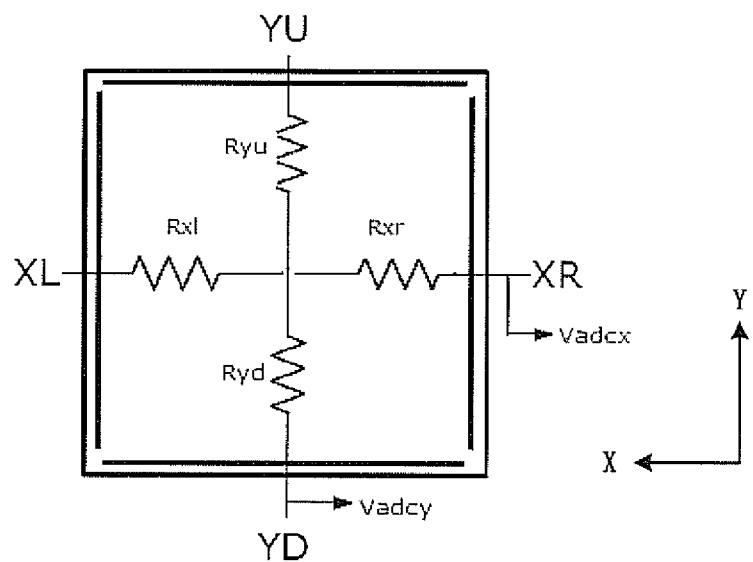
FIG. 2 is an equivalent schematic circuit of the screen body of the resistive touch screen shown by FIG. 1.
Figure 3:
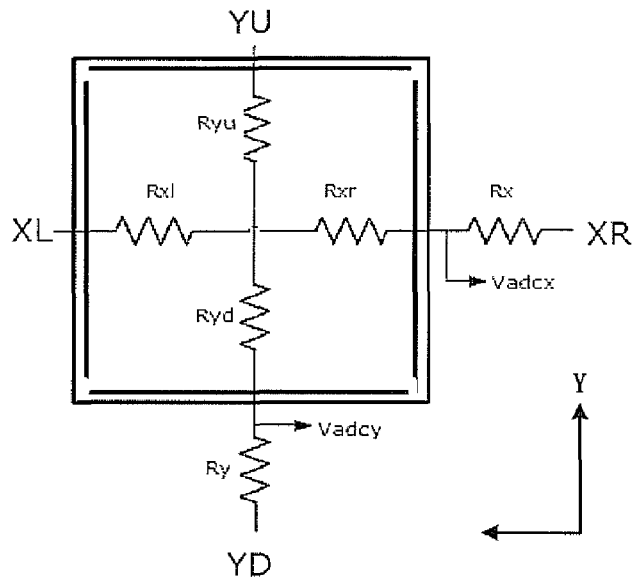
FIG. 3 is an equivalent schematic circuit of the screen body of the resistive touch screen of the present invention.

As shown in FIG. 3, it is an equivalent schematic circuit of the screen body of the resistive touch screen of the present invention. In the embodiment of the present invention, the resistive touch screen is set to be the single-point touching status, and then an electric field is generated on the X axis and the voltage value on the first test resistor Rx is detected as a first reference voltage Vadcx_ref. Meanwhile, an electric field is generated on the Y axis and the voltage value on the second test resistor Ry is detected as a second reference voltage Vadcy_ref.

Figure 4:
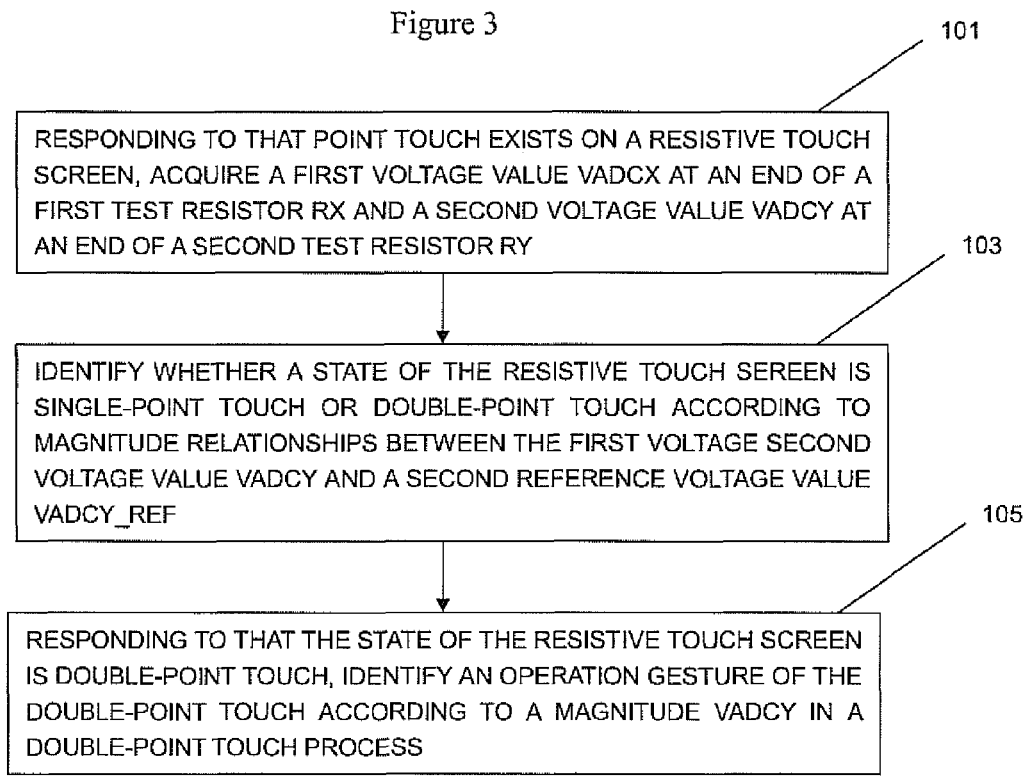
FIG. 4 is a flow diagram of the double-point detection processing method for resistive touch screen of the present invention.

FIG. 4 is a flow diagram of the double-point detection processing method for resistive touch screen of the present invention. As shown in FIG. 4, the double-point detection processing method for resistive touch screen of the embodiment includes:

101. in response to the point touch on the resistive touch screen, a first voltage value Vadcx of first test resistor Rx and a second voltage value Vadcy of the second test resistor Ry are obtained;

as an example, during the point touching process on resistive touch screen, a first voltage value Vadcx is obtained by sampling the test point of the electrical connection point which is connected to the first test resistor Rx with a preconfigured sample frequency and performing analog to digital conversion by the use of ADC, and a second voltage value Vadcy is obtained by sampling the test point of the electrical connection point which is connected to the second test resistor Ry with a preconfigured sample frequency and performing analog to digital conversion by the use of ADC.

Wherein, there can be a variety of ways to detect whether a touch occurs on the resistive touch screen or not. For example, a weak pull-up resistor can be used to pull up one of the first conducting layer panel and the second conducting layer panel while a strong pull-down resistor can be used to pull down the other panel. If the measured voltage of the pulled up layer panel is greater than a certain logic threshold, it means that there is no touch, otherwise there is a touch.

103. according to the magnitude relationship between the first voltage value Vadcx and the first reference voltage value Vadcx_ref, and according to the magnitude relationship between the second voltage value Vadcy and the second reference voltage value Vadcy_ref, whether the status of the resistive touch screen is single-point touching or double-point touching is identified.

Wherein, the first reference voltage value Vadcx_ref is the voltage value of the first test resistor Rx when a single-point touching is performed on the resistive touch screen and a electric field is generated on the X axis; the second reference voltage value Vadcy_ref is the voltage value of the second test resistor Ry when a single-point touching is performed on the resistive touch screen and a electric field is generated on the Y axis.

105. in response to the status when the resistive touch screen is double-point touching, the operation gesture is identified according to the magnitude change trend of the first voltage value Vadcx and the second voltage value Vadcy in the double-point touching process; wherein, the operation gesture of double-point touching includes gesture with no relative motion between double-point, magnification gesture, shrink gesture and rotation gestures.

In the resistive touch screen provided by the above embodiment of the present invention, the first test resistor Rx is connected in series on the X axis on the screen body of the resistive touch screen and the second test resistor Ry is connected in series on the Y axis. And a first reference voltage values Vadcx_ref of the first test resistor Rx side and a second voltage value Vadcy_ref on the second test resistor Ry side are obtained in advance when the single-point touching is performed. When there is point touch on the resistive touch screen, a first voltage value Vadcx of the first test resistor Rx and a second voltage value Vadcy of the second test resistor Ry are obtained. The voltage value on the same test point will change because the first test resistor Rx is connected in series on the X axis and the second test resistor Ry is connected in series on the Y axis. Hence, according to the magnitude relationship between the first voltage value Vadcx and the first reference voltage value Vadcx_ref, and according to the magnitude relationship between the second voltage value Vadcy and the second reference voltage value Vadcy_ref, whether the status of the resistive touch screen is single-point touching or double-point touching is identified. If the status of the resistive touch screen is double-point touching, the operation gesture is identified according to the magnitude change trend of the first voltage value Vadcx and the second voltage value Vadcy in the double-point touching process. The operation gesture of double-point touching includes gesture with no relative motion between double-point, magnification gesture, shrink gesture and rotation gestures and so on. Thereby the double-point detection of the resistive touch screen is realized, the limitation of the application that the resistive touch screen can only detect single-point touching application is broken, the software applications of the resistive touch screen is enriched and the user experience is enhanced. Since the great difference between the resistive touch screen and capacitive touch screen in price, the embodiments of the invention can effectively promote the application of the resistive touch screen, which will extend the application range of the resistive touch screen and make the embodiment of the invention possess a certain practical value and significance.

Figure 5:
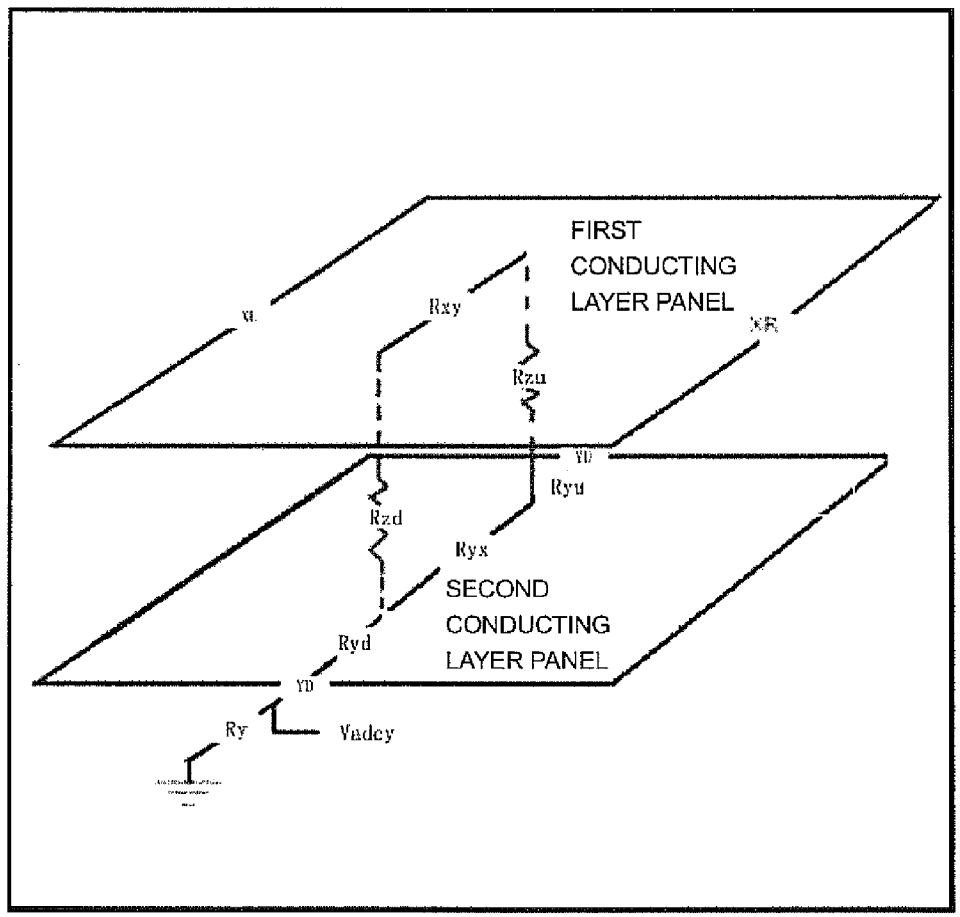
FIG. 5 is a schematic diagram of an equivalent circuit of the screen body of the resistive touch screen in an embodiment of the present invention.
Figure 6:
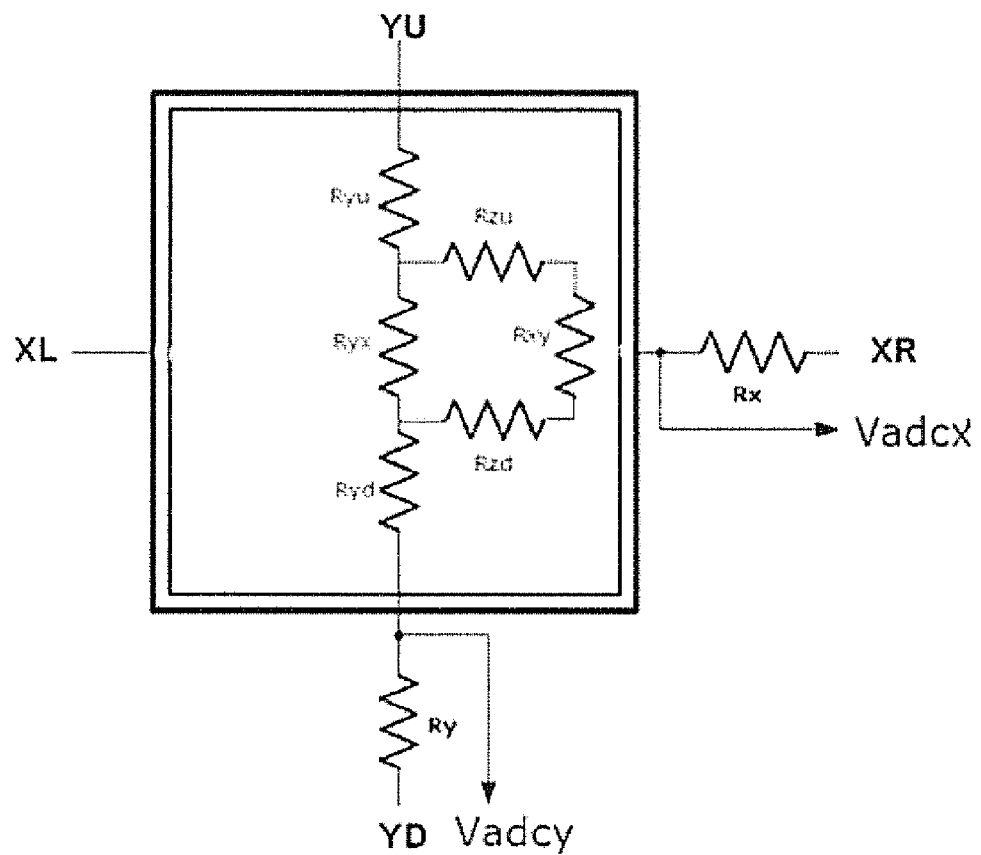
FIG. 6 is another view of the specific embodiment shown by FIG. 5.

As shown in FIG. 5, it is a schematic diagram of an equivalent circuit of the screen body of the resistive touch screen in an embodiment of the present invention. FIG. 6 is another view of the specific embodiment shown by FIG. 5. In order to illustrate the embodiments more clearly, the equivalent resistor of X axis is not shown in FIG. 5. Referring to FIG. 5 and FIG. 6 and in the specific embodiment, the two electrical connection ends on the first conducting layer panel are a first electrical connection end XL and a second electrical connection end XR. Wherein, the first electrical connection end XL is connected to the positive voltage, and the second electrical connection end XR is connected to ground Vdd. The two electrical connection ends on the second conducting layer panel are a third electrical connection end YU and a fourth electrical connection end YD. The third electrical connection end YU is connected to the positive voltage, and the fourth electrical connection end YD is connected to ground Vdd. The first test resistor Rx is connected in series between the second electrical connection end XR and the first test point of the second electrical connection end XR, the second test resistor Ry is connected in series between the fourth electrical connection end YD and the second test point of the fourth electrical connection end YD.

Referring to FIG. 5 and FIG. 6, Points K and L are pressed down when K, L is performed as double-point touching on the first conducting layer panel so as to contact with M, N on the second conducting layer panel respectively, which makes it conductive between K and M, and conductive between L and N. The equivalent resistor between K and M can be defined as Rzd and the equivalent resistor between L and N can be defined as Rzu. At this moment, the resistance between K and M, as well as the resistance between L and N reduce from the infinity when no contacting so that the parallel connection effect appears between the equivalent resistor Rxy and the equivalent resistor Ryx of the two conducting layer panel. For example, the resistance value between K and M and the resistance value between L and N change from the infinity when no contacting to the contact resistance with level of hundred ohms, the reduced resistance value will be different according to the different types of resistive touch screen. And the reduced resistance will also be changed with the change of pressure when touched. The lighter the pressure is, the greater the resistance will be and it may reach 10K ohm level and the parallel effect will be weakened. At this time, the resistance in Y axis direction changes with reference to the situation of single-point touching, the parallel effect make the resistance value inside the screen body in Y axis direction parallel be reduced. Therefore, the second voltage value Vadcy read by the test point of the electrical connection end where the second test resistor Ry locates is bigger than the voltage value read when single-point touching. Thus, in the embodiment of the present invention, it is available to identify the status of the resistive touch screen is single-point touching or double-point touching by generating an electric field on the Y axis and comparing the magnitude relationship between the second voltage value Vadcy and the second reference voltage value Vadcy_ref. In the same way, it is also available to identify the status of the resistive touch screen is single-point touching or double-point touching by generating an electric field on the X axis and comparing the magnitude relationship between the first voltage value Vadcx and the first reference voltage value Vadcx_ref.

According to an embodiment of the present invention which is just an example and not a limitation, in the specific embodiment shown in FIG. 5 and FIG. 6, it is available to obtain the second voltage value Vadcy in Y axis by following means when double-point touching is preformed.

Given: $Ryz=Rxy+Rzu+Rzd$;

$Vadcy=Vdd*Ry/(Ry+Ryu+Ryd+(Ryx*Ryz/(Ryx+Ryz)))$;

the resistance value inside the screen body in Y axis direction when single-point touching is $Ry\_ref=Ryu+Ryd+Ryx$;

$$\begin{aligned}Vadcy\_ref &= Vdd*Ry/(Ry+Ryu+Ryd+Ryx) \quad (1)\\ &= VDD*Ry/(Ry+Ry\_ref)\end{aligned}$$

$$\begin{aligned}Vadcy &= Vdd*Ry/(Ry+Ry\_ref-Ryx+(Ryx*Ryz/(Ryx+Ryz)))\\ &= Vdd*Ry/(Ry+Ry\_ref-Ryx*Ryx/(Ryx+Ryz))\end{aligned}$$

Wherein, Ryx and Ryz in formula (1) are variable while the rests are constant.

According the conducting property of the resistive touch screen, it can be got that: $Ryx=m*(\Delta Y)$, i.e. the longer the length in Y axis direction is, the bigger the corresponding resistance value will be. Wherein, m is the electric conductivity of the second conducting layer panel which is bigger than zero, i.e. m>0. When the first conducting layer panel fully contacts with the second conducting layer panel, the resistance value Rzu and Rzd will be small and negligible. Meanwhile, as the mediums of the body portion of the same resistive touch screens are similar, there should be $Rxy=Ryx$, and $Ryz=Rxy+Rzu+Rzd\approx n*(\Delta Y)$, n is the electric conductivity of the first layer panel which is bigger than zero, i.e. n>0. Based on this, it can be obtained by the formula (1) mentioned above:

$$Vadcy=Vdd*Ry/(Ry+Ryref\_k*(\Delta Y))\qquad(2)$$

Wherein, $k=m^2/(m+n)$, $k>0$. Based on formula (2), the second voltage value Vadcy monotonically increments with the distance $\Delta Y$ between the double-point touching Points K and L in the direction of Y axis. In the same way, it may also be got that the first voltage value Vadcy monotonically increments with the distance $\Delta X$ between the double-point touching Points K and L in the direction of X axis. Therefore, the second voltage value Vadcy will be increased when the distance between the double-point touching in Y axis increased; the second voltage value Vadcy will be reduced when the distance between the double-point touching in Y axis decreased. The first voltage value Vadcx will be increased when the distance between the double-point touching in X axis increased; the first voltage value Vadcx will be reduced when the distance between the double-point touching in Y axis decreased. In the embodiment of the present invention, it is available to identify the operation gesture according to the magnitude change trends of the first voltage value Vadcx and the second voltage value Vadcy in the double-point touching process, for example, the gesture with no relative motion between double-point, magnification gesture, shrink gesture and rotation gestures.

In order to make the application of the embodiment of the present invention be more clear and intuitive, the following context will make a further description to the operation 105 of the embodiment shown by FIG. 4 in conjunction with the embodiments shown by FIG. 5 and FIG. 6 exemplarily. Alternatively, it is also available to make the first electrical connection end XL of the two electrical connection ends on the first conducting layer panel to connect to ground Vdd, while the second electrical connection end XR is connected to the positive voltage; the third electrical connection end YU of the two electrical connection ends on the second conducting layer panel is connected to ground Vdd, while the fourth electric connection end YD is connected to the positive voltage. The first test resistor Rx is connected in series between the first electrical connection end XL and the third test point of the first electrical connection end XL, the second test resistor Ry is connected in series between the third electrical connection end YU and the fourth test point of the third electrical connection end YU.

Based on the above two types of the specific examples, when the operation 105 is performed:

identifying the magnitude change trend of the first voltage value Vadcx and the second voltage value Vadcy during the double-point touching process;

if both the first voltage value Vadcx and the second voltage value Vadcy appear no effective trend, it identifies the operation gesture of the double-point touching is the gesture with no relative motion between double-point;

if the first voltage value Vadcx appears an effective increasing trend while the second voltage value Vadcy appears no effective trend, or the first voltage value Vadcx appears no effective trend while the second voltage value Vadcy appears an effective increasing trend during the double-point touching process, it identifies the operation gesture of the double-point touching is the gesture for magnifying;

if the first voltage value Vadcx appears an effective decreasing trend while the second voltage value Vadcy appears no effective trend, or the first voltage value Vadcx appears no effective trend while the second voltage value Vadcy appears an effective decreasing trend during the double-point touching process, it identifies the operation gesture of the double-point touching is the gesture for shrinking;

if the first voltage value Vadcx appears an effective increasing or decreasing trend and the second voltage value Vadcy appears an effective increasing or decreasing trend during the double-point touching process, it identifies the operation gesture of the double-point touching is the gesture for rotation.

The application embodiment mentioned above only provides two specific examples to describe the application of the embodiment of the present invention. However, the embodiment of the present invention can be used in any other kind of detection process for double-point touching which is not limited in the two specific examples mentioned above. The skilled in the art can adjust the specific determination conclusion according to the operation gesture of the double-point touching of the present invention.

For example, in another embodiment, the first electrical connection end XL of the two electrical connection ends on the first conducting layer panel is connected to ground Vdd, while a second electrical connection end XR is connected to the positive voltage; a third electrical connection end YU of the two electrical connection ends on the second conducting layer panel is connected to ground Vdd, while a fourth electrical connection end YD is connected to the positive voltage; the first test resistor Rx is connected in series between the second electrical connection end XR and the first test point of the second electrical connection end XR, and the second test resistor Ry is connected in series between the fourth electrical connection end YD and the second test point of the fourth electrical connection end YD. In another embodiment, the first electrical connection end XL of the two electrical connection ends on the first conducting layer panel is connected to the positive voltage, while the second electrical connection end XR is connected to ground Vdd; the third electrical connection end YU of the two electrical connection ends on the second conducting layer panel is connected to the positive voltage, while the fourth electric connection end YD is connected to ground Vdd; the first test resistor Rx is connected in series between the first electrical connection end XL and the third test point of the first electrical connection end XL, while the second test resistor Ry is connected in series between the third electrical connection end YU and the fourth test point of the third electrical connection end YU. When the embodiment of the present invention is applied to these further two specific examples:

identifying the magnitude change trend of the first voltage value Vadcx and the second voltage value Vadcy during the double-point touching process;

if both the first voltage value Vadcx and the second voltage value Vadcy appear no effective trend, it identifies the operation gesture of the double-point touching is the gesture with no relative motion between double-point;

if the first voltage value Vadcx appears an effective increasing trend while the second voltage value Vadcy appears no effective trend, or the first voltage value Vadcx appears no effective trend while the second voltage value Vadcy appears an effective increasing trend during the double-point touching process, it identifies the operation gesture of the double-point touching is the gesture for shrinking;

if the first voltage value Vadcx appears an effective decreasing trend while the second voltage value Vadcy appears no effective trend, or the first voltage value Vadcx appears no effective trend while the second voltage value Vadcy appears an effective decreasing trend during the double-point touching process, it identifies the operation gesture of double-point touching is the gesture for magnifying;

if the first voltage value Vadcx appears an effective increasing or decreasing trend and the second voltage value Vadcy appears an effective increasing or decreasing trend during the double-point touching process, it identifies the operation gesture of double-point touching is the gesture for rotation.

Furthermore, in other specific embodiment, there is only one electrical connection end on one of the first conducting layer panel and the second conducting layer panel which are reverse connection compared to the embodiment shown by FIGS. 5 and 6. For example, the first electrical connection end XL is connected to the positive voltage, the second electrical connection end XR is connected to ground Vdd, the third electrical connection end YU is connected to ground Vdd, and the fourth electrical connection end YD is connected to the positive voltage; alternatively, the first electrical connection end XL is connected to ground Vdd, the second electrical connection end XR is connected to the positive voltage; the third electrical connection end YU is connected to the positive voltage, the fourth electric connection end YD is connected to ground Vdd.

At this time, if only the electrical connection end on the first conducting layer is reverse connection compared to the embodiment shown by FIGS. 5 and 6, it is available to get the same determination result with the embodiment shown by FIGS. 5 and 6 when identifying the gesture of double-point touching and the effective change of the first voltage value Vadcx is opposite to the embodiment shown by FIGS. 5 and 6 in the corresponding relationship between the determination conditions of the change of voltage trend and the determination result. For example, during the double-point touching process, if the first voltage value Vadcx appears an effective decreasing trend while the second voltage value Vadcy appears no effective trend, or the first voltage value Vadcx appears no effective trend while the second voltage value Vadcy appears an effective increasing trend, it identifies the operation gesture of the double-point touching is the gesture for magnifying; during the double-point touching process, if the first voltage value Vadcx appears an effective increasing trend while the second voltage value Vadcy appears no effective trend, or the first voltage value Vadcx appears no effective trend while the second voltage value Vadcy appears an effective decreasing trend, it identifies the operation gesture of the double-point touching is the gesture for shrinking.

If only the electrical connection end on the second conducting layer is reverse connection compared to the embodiment shown by FIGS. 5 and 6, it is available to get the same identification result with the embodiment shown by FIGS. 5 and 6 when identifying the gesture of double-point touching and the effective change of the second voltage value Vadcy is opposite to the embodiment shown by FIGS. 5 and 6 in the corresponding relationship between the determination conditions of the change of voltage trend and the identification result. For example, during the double-point touching process, if the first voltage value Vadcx appears an effective increasing trend while the second voltage value Vadcy appears no effective trend, or the first voltage value Vadcx appears no effective trend while the second voltage value Vadcy appears an effective decreasing trend, it identifies the operation gesture of the double-point touching is the gesture for magnifying; during the double-point touching process, if the first voltage value Vadcx appears an effective decreasing trend while the second voltage value Vadcy appears no effective trend, or the first voltage value Vadcx appears no effective trend while the second voltage value Vadcy appears an effective increasing trend, it identifies the operation gesture of double-point touching is the gesture for shrinking.

In addition, in any connection situation of the electrical connection end on the first conducting layer panel and the second conducting layer panel in the above embodiments, the first test resistor Rx could be set in series between the second electrical connection end XR and the first test point of the second electrical connection end XR, or the first test resistor Rx could be set in series between the first electrical connection end XL and the third test point of the first electrical connection end XL; in the same way, the second test resistor Ry could be set in series between the fourth electrical connection end YD and the second test point of the fourth electrical connection end YD, or the second test resistor Ry could be set in series between the third electrical connection end YU and the fourth test point of the third electrical connection end YU.

Likewise, based on the above embodiments of the present invention, the skilled in the art could be understand that if the first test resistor Rx is moved from the place between the second electrical connection end XR and the first test point to the place between the first electrical connection end XL and the third test point of the first electrical connection end XL, or moved from the place between the first electrical connection end XL and the third test point to the place between the second electrical connection end XR and the first test point, when identifying the gesture of double-point touching and the effective change of the first voltage value Vadcx is opposite to corresponding embodiment in the corresponding relationship between the judgement conditions of the change of voltage trend and the identification result, the same identification result in accordance with the corresponding embodiment can be achieved. For example, comparing with the embodiment shown by FIGS. 5 and 6, if the first test resistor Rx is moved to the place which is in series between the first electrical connection end XL and the third test point of the first electrical connection end XL while the place of the second test resistor Ry does not change, it is available to get that if the first voltage value Vadcx appears an effective decreasing trend while the second voltage value Vadcy appears no effective trend, or the first voltage value Vadcx appears no effective trend while the second voltage value Vadcy appears an effective increasing trend during the double-point touching process, it identifies the operation gesture of the double-point touching is the gesture for magnifying; if the first voltage value Vadcx appears an effective increasing trend while the second voltage value Vadcy appears no effective trend, or the first voltage value Vadcx appears no effective trend while the second voltage value Vadcy appears an effective decreasing trend during the double-point touching process, it identifies the operation gesture of the double-point touching is the gesture for shrinking.

In the same way, based on the above embodiments of the present invention, the skilled in the art could understand that it is available to get the same identification result with the corresponding embodiment if the second test resistor Ry is moved from the place between the fourth electrical connection end YD and the second test point of above embodiments to the place between the third electrical connection end YU and the fourth test point, or from the place between the third electrical connection end YU and the fourth test point to the place between the fourth electrical connection end YD and the second test point when identifying the gesture of double-point touching and the effective change of the first voltage value Vadcy is opposite to corresponding embodiment in the corresponding relationship between the judgement conditions of the change of voltage trend and the identification result. For example, comparing with the embodiment shown by FIGS. 5 and 6, if the first voltage value Vadcx appears an effective increasing trend while the second voltage value Vadcy appears no effective trend, or the first voltage value Vadcx appears no effective trend while the second voltage value Vadcy appears an effective decreasing trend during the double-point touching process, it identifies that the operation gesture of the double-point touching is the gesture for magnifying; if the first voltage value Vadcx appears an effective decreasing trend while the second voltage value Vadcy appears no effective trend, or the first voltage value Vadcx appears no effective trend while the second voltage value Vadcy appears an effective increasing trend during the double-point touching process, it identifies the operation gesture of the double-point touching is the gesture for shrinking.

Therefore, the embodiment of the present invention could apply every possible location of the first test resistor Rx and the second test resistor Ry in any connection condition of the electrical connection end between the first conducting layer panel and the second conducting layer panel, the skilled in the art could achieve the embodiments of the present invention by adjusting the corresponding relationship between the condition of the effective change of the voltage value and the result. Therefore, no more repeat here.

Figure 7A:
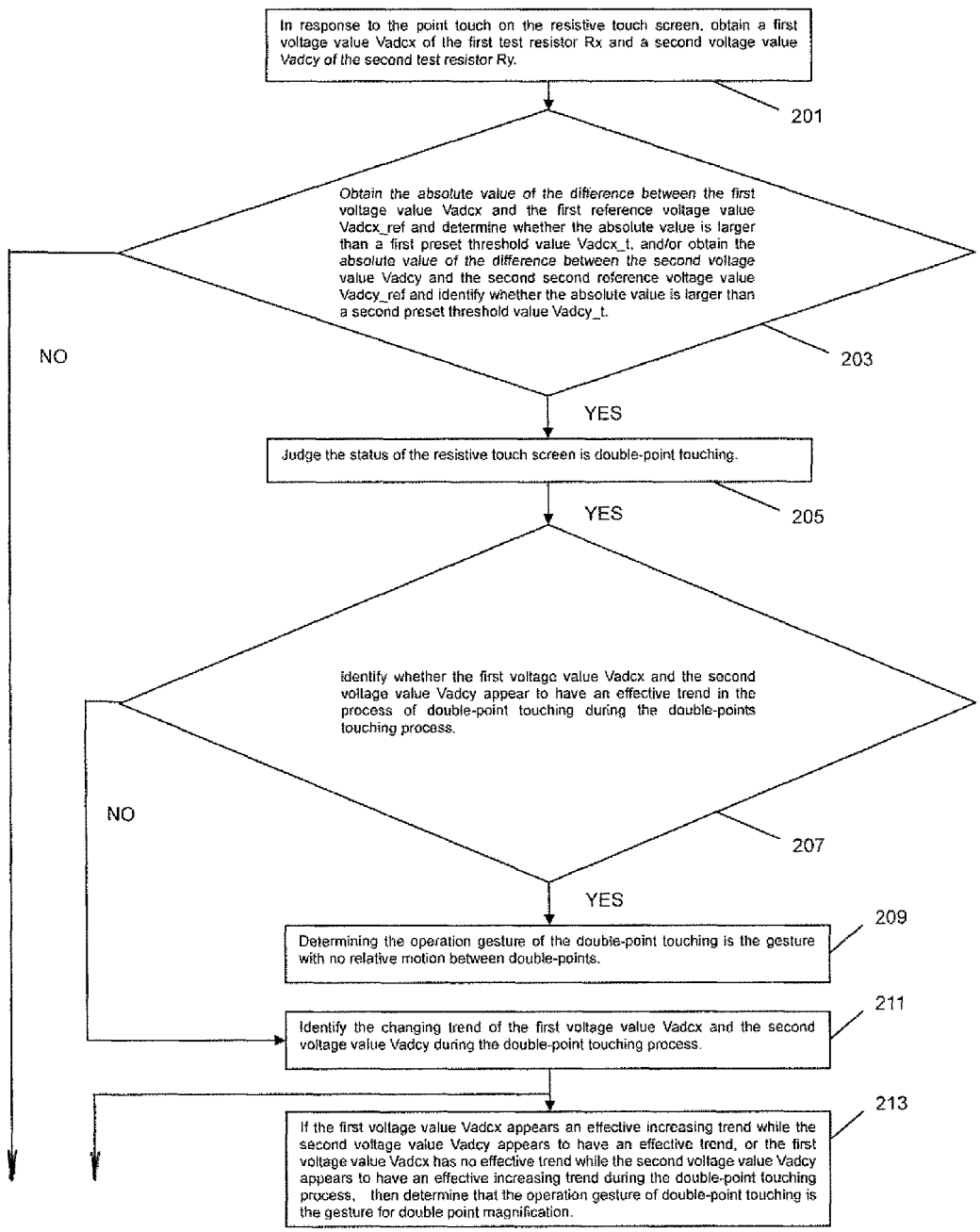
Figure 7B:
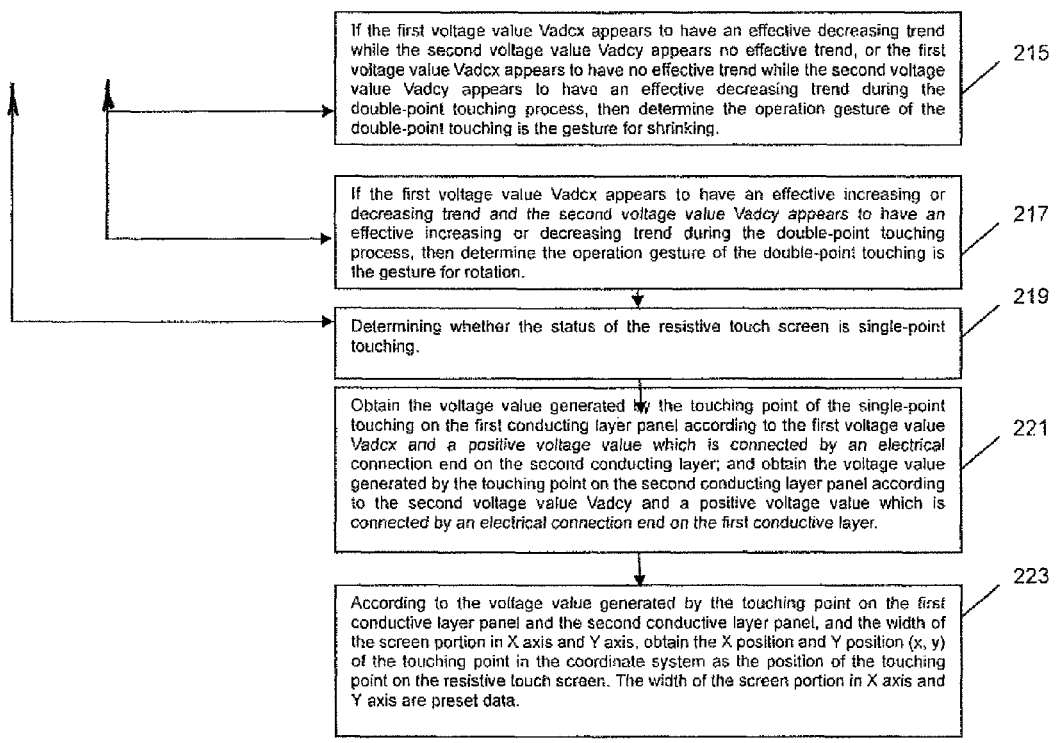

FIGS. 7a and 7b show the flow diagram of another embodiment of the double-point detection processing method for resistive touch screen of the present invention. As shown in FIG. 5, the double-point detection processing method for resistive touch screen of the embodiment includes:

201, in response to the point touch on the resistive touch screen, obtaining a first voltage value Vadcx of the first test resistor Rx and a second voltage value Vadcy of the second test resistor Ry.

As an example, using the ADC (Analog to Digital Converter) to obtain a first voltage value Vadcx by sampling the test point of the electrical connection point which is connected to the first test resistor Rx with a preconfigured sample frequency for Vadcx and by performing analog to digital conversion; and using the ADC to obtain a second voltage value Vadcy by sampling the test point of the electrical connection point which is connected to the second test resistor Ry with a preconfigured sample frequency for Vadcy and by performing analog to digital conversion. The sample frequency for Vadcx and sample frequency for Vadcy can be the same or different.

203, obtaining the absolute value of the difference between the first voltage value Vadcx and the first reference voltage value Vadcx_ref and identifying whether the absolute value is larger than a first preconfigured threshold value Vadcx_t, and obtaining the absolute value of the difference between the second voltage value Vadcy and the second second reference voltage value Vadcy_ref and identifying whether the absolute value is larger than a second preconfigured threshold value Vadcy_t.

If the absolute value of difference between the first voltage value Vadcx and the first reference voltage value Vadcx_ref is greater than the first threshold value Vadcx_t, and/or if the absolute value of difference between the second voltage value Vadcy and the second reference voltage value Vadcy_ref is greater than the preconfigured threshold value Vadcy_t, Operation 205 should be performed.

Otherwise, if the absolute value of difference between the first voltage value Vadcx and the first reference voltage value Vadcx_ref is not greater than the first threshold value Vadcx_t, and if the absolute value of difference between the second voltage value Vadcy and the second reference voltage value Vadcy_ref is not greater than the preconfigured threshold value Vadcy_t, Operation 219 should be performed.

205, determining the status of the resistive touch screen is double-point touching.

207, identifying the changing trend of the first voltage value Vadcx and the second voltage value Vadcy during the double-point touching process. Firstly, identifying whether the first voltage value Vadcx and the second voltage value Vadcy appear effective trend in the process of double-point touching. If both the first voltage value Vadcx and the second voltage value Vadcy appear no effective trend, Operation 209 is performed. Otherwise, if the first voltage value Vadcx and/or the second voltage value Vadcy appears effective trend, Operation 211 is performed.

209, determining the operation gesture of the double-point touching is the gesture with no relative motion between double-point.

No further subsequent processes in this embodiment will be performed thereafter.

211, identifying the changing trend of the first voltage value Vadcx and the second voltage value Vadcy during the double-point touching process.

The application of the specific embodiment shown by FIGS. 5 and 6 is further taken as an example, if the first voltage value Vadcx appears an effective increasing trend while the second voltage value Vadcy appears no effective trend, or the first voltage value Vadcx appears no effective trend while the second voltage value Vadcy appears an effective increasing trend during the double-point touching process, then Operation 213 is performed.

If the first voltage value Vadcx appears an effective decreasing trend while the second voltage value Vadcy appears no effective trend, or the first voltage value Vadcx appears no effective trend while the second voltage value Vadcy appears an effective decreasing trend during the double-point touching process, then Operation 215 is performed.

If the first voltage value Vadcx appears an effective increasing or decreasing trend and the second voltage value Vadcy appears an effective increasing or decreasing trend during the double-point touching process, then Operation 217 is performed.

213, determining the operation gesture of double-point touching is the gesture for magnifying.

After that, it will no longer perform subsequent processes in this embodiment.

215, determining the operation gesture of the double-point touching is the gesture for shrinking.

After that, it will no longer perform subsequent processes in this embodiment.

217, determining the operation gesture of the double-point touching is the gesture for rotation.

After that, it will no longer perform subsequent processes in this embodiment.

219, determining the status of the resistive touch screen is single-point touching. As an example, it may perform the following operation further, 221, obtaining the voltage value generated by the touching point of the single-point touching on the first conducting layer panel according to the first voltage value Vadcx and a positive voltage value which is connected by an electrical connection end on the second conducting layer; and obtaining the voltage value generated by the touching point on the second conducting layer panel according to the second voltage value Vadcy and a positive voltage value which is connected by an electrical connection end on the first conducting layer.

223, according to the voltage value generated by the touching point on the first conducting layer panel and the second conducting layer panel, and according to the width of the screen body in X axis and Y axis, obtaining the X position and Y position (x, y) of the touching point in the coordinate system as the position of the touching point on the resistive touch screen. The width of the screen body in X axis and Y axis are preconfigured data.

According to an embodiment of the double-point detection processing method for resistive touch screen which is an example but not a limit, it can be regarded as a contact of the intermediate point between the two points when performing double-point touching. Therefore, the way of obtaining the position of the touching point on the screen of resistive touch screen in the operation 221 to 223 can be taken as a reference to obtain the movement track of the mid point between the double-point further. Therefore, it is available to identify the direction of rotation gesture appeared by the double-point is clockwise or counterclockwise according to the effective trend of the first voltage value Vadcx and the second voltage value Vadcy and the movement track information of the mid point between the double-point. For example, based on the embodiment shown by FIGS. 5 and 6, if the first voltage value Vadcx appears an effective increasing trend while the second voltage value Vadcy appears an effective decreasing trend and the movement track of the mid point between the double-point is toward bottom right or top left in the process of double-point touching, or the first voltage value Vadcx appears an effective decreasing trend while the second voltage value Vadcy appears an effective increasing trend and the movement track of the mid point between the double-point is toward bottom left or top right in the process of double-point touching, it can be identified that the rotation gesture by the double-point is clockwise. In another example, if the first voltage value Vadcx appears an effective increasing trend while the second voltage value Vadcy appears an effective decreasing trend and the movement track of the mid point between the double-point is toward bottom left or top right in the process of double-point touching, or the first voltage value Vadcx appears an effective decreasing trend while the second voltage value Vadcy appears an effective increasing trend and the movement track of the mid point between the double-point is toward bottom right or top left in the process of double-point touching, then it can be identified that the rotation gesture by the double-point is anticlockwise.

In addition, based on the embodiments of the present invention mentioned above, when the position information of the touching point on the screen of the resistive touch screen and operation gesture information of the double-point touching in single-point touching are obtained, it may be reported to the application. Alternatively, the position information of the mid point between the double-point on the screen of the resistive touch screen may also be reported to the application together. Then the application will carry on a homologous control to the display of itself on the screen of the resistive touch screen according to the position information of the touching point on the screen of the resistive touch screen and operation gesture information of the double-point touching when single-point touching is performed, for example, triggering event, or enlarging the image, shrinking the image, rotating for control.

As the performance of resistive touch screen is not always satisfactory, there will be constant change of the pressure by the double-point touching in the actual operation, thus the Rzu and Rzd will not be ignorable because the first conducting layer panel and the second conducting layer panel would probably has insufficient contact when the resistive touch screen is lightly pressed. Therefore, the equation Ryz≈n*(ΔY) is not always held in practice, which makes the equation (2) be not always monotonical. For example, the change of pressure (heavy or lightly) in the double-point touching will introduce a new variable: pressure. Therefore, the equation (2) is corrected to:

$$Vadcy = Vdd * Ry / (Ry + Ry\_ref - k*(\Delta Y) - j*(\Delta P)) \quad (3)$$

Wherein, k>0; j represents the pressure factor and j>0; P is the pressure, ΔP represents the increase of the pressure. If it is on Y axis, ΔY increases when the double-point appears the gesture for magnifying. But when the pressure of press may decrease in the double-point touching, i.e. ΔP decreases. Alternatively, double-point appears the gesture for shrinking, i.e. ΔY decreases. But the pressure may become heavier when pressing down in the double-point touching, i.e. ΔP increases. In both situations, the trend of the second voltage value Vadcy can not be identified. In the same way, there will be similar condition on the X axis, the double-point appears the gesture for magnification while the pressure pressing down is becoming lighter, or the double-point appears the gesture for shrinking while the pressure pressing down is becoming heavier, either situation will make the trend of the first voltage value Vadcx uncertain. The above situations may be called the failures of the double-point touching operation, which will be reflected as a small trend of continuous and probabilistic errors in the actual application and the final identification result of the double-point operation will appear probabilistic errors.

Since the two points on the first conducting layer panel is pressed down, the parallel connection effect of the two equivalent resistor appears between the first conducting layer panel and the second conducting layer panel. The value of the equivalent resistor reduces from infinite when no contacting and will change together with the pressure, i.e. the lighter the pressure is, the bigger the resistance value will be. Since the value of the equivalent resistor in X axis and Y axis will both change when single-point touching is performed, for example, the resistance value inside the screen body in Y axis is Ryu+Ryx+Ryd when single-point touching, thus the voltage value Vadcx_ref read on the test point of the first test resistor Rx and the voltage value Vadcy_ref on the test point of the second test resistor Ry when single-point touching will be a stable value.

In the embodiment shown by FIG. 4, the change of the equivalent resistor between the first conducting layer panel and the second conducting layer panel which is caused by the pressure factor when double-point touching in actual application, as well as the resulting influence to the change of the first voltage value Vadcx and the second voltage value Vadcy are fully considered. According to the performance parameters of the resistive touch screen for actual use, a reasonable first threshold Vadcx_t and a reasonable second threshold Vadcy_t are preconfigured. If the absolute value of difference between the first voltage value Vadcx and the first reference voltage value Vadcx_ref is greater than the first threshold value Vadcx_t, then identifying that the first voltage value Vadcx become bigger relative to single-point touching; if the absolute value of difference between the second voltage value Vadcy and the second reference voltage value Vadcy_ref is greater than the preconfigured threshold value Vadcy_t, the status of the resistive touch screen is identified as double-point touching, then identifying that the second voltage value Vadcy become bigger relative to single-point touching. Hence, the current status of the resistive touch screen will be known as double-point touching so long as one of first voltage value Vadcx and the second voltage value Vadcy changes, thus the judgement for double-point detection in the condition of pressure factor in the actual application is realized and the present invention is more suitable for practical use. The first preconfigured threshold value Vadcx_t and the second preconfigured threshold value Vadcy_t can be set according to the actual performance parameters of specific resistive touch screen and can be adjusted according to other factors.

In the double-point detection processing method of the above embodiments of the present invention, when identifying whether the status of the resistive touch screen is single-point touching or double-point touching, it is available to set the preconfigured analysis step as the unit. It is available to analyze the magnitude relationship between the first voltage Vadcx and the first reference voltage value Vadcx_ref as well as the magnitude relationship between the second voltage value Vadcy and the second reference voltage value Vadcy_ref of each sampling point in each preconfigured analysis step according to the method of the embodiment above of the present invention. Meanwhile, the status of the resistive touch screen is single-point touching or double-point touching in each preconfigured analysis step may also be analyzed respectively.

Accordingly, when identifying the operation gesture of double point touching according to the trend of the first voltage value Vadcx and the second voltage value Vadcy, it is available to set the preconfigured analysis step as the unit and to identify the changing trend of the first voltage value Vadcx and the second voltage value Vadcy in preconfigured analysis step unit by the method of the above embodiments of the present invention. And it is available to identify the operation gesture of double point touching in each preconfigured analysis step according to the changing trend of the first voltage value Vadcx and the second voltage value Vadcy in each sampling points in each preconfigured analysis step.

As an example, if the increase of the first voltage value Vadcx reaches to a preconfigured effective increasing threshold in each sampling point in the preconfigured analysis step, then the first voltage value Vadcx appears an effective increasing trend; if the decrease of the first voltage value Vadcx reaches to a preconfigured effective decreasing threshold in each sampling point in the preconfigured analysis step, then the first voltage value Vadcx appears an effective decreasing trend. In the same way, if the increase of the second voltage value Vadcy reaches to a preconfigured effective increasing threshold in each sampling point in the preconfigured analysis step, then the second voltage value Vadcy appears an effective increasing trend; if the decrease of the second voltage value Vadcy reaches to a preconfigured effective decreasing threshold in each sampling point in the preconfigured analysis step, then the first voltage value Vadcy appears an effective decreasing trend.

In the embodiment of the present invention, Vadcx and Vadcy are sampled with preconfigured sample frequency for Vadcx and preconfigured sample frequency for Vadcy respectively. The sampling points are counted and analyzed in a point-by-point small trend in the preconfigured analysis step in accordance with the appropriate length of the preconfigured analysis step. Therefore, the constant change of the operation gesture in the process of double-point touching can be achieved in order to perform sensitive control to the screen display of the application on the resistive touch screen based on the change of the double-point operation gesture. As there are constant change of force in the double-point touching, the first conducting layer panel and the second conducting layer panel would probably has insufficient contact when the resistive touch screen is lighted pressed and then the final identification result of the double-point operation will appear probabilistic errors. In order to avoid the misdetermination to the double-point gesture caused by the reduction of the effectiveness of the point-by-point small trend analyzed based on the sample point in the preconfigured step. In the embodiment of the present invention, according to change range of the pressure of touching, appropriate thresholds are set for effective changing including the increasing threshold and the decreasing threshold to count, to analyze and to filter the sampling points in a point-by-point small trend in the preconfigured analysis step and output effective increasing or decreasing trend of the first voltage value Vadcx and the second voltage value Vadcy, based on each preconfigured analysis step. The frequent changes of the effective changing trend caused by the uneven pressure force are filtered through division and quantification to the first voltage value Vadcx and the second voltage value Vadcy and the noise due to the change of pressure is also effectively filtered in the divided areas. In order to make the effect of the present invention be more intuitive and more obvious, the following context will make a further description as examples to the effective filtration principle to the noise in the divided intervals which is introduced by the change of pressure.

Figure 8:
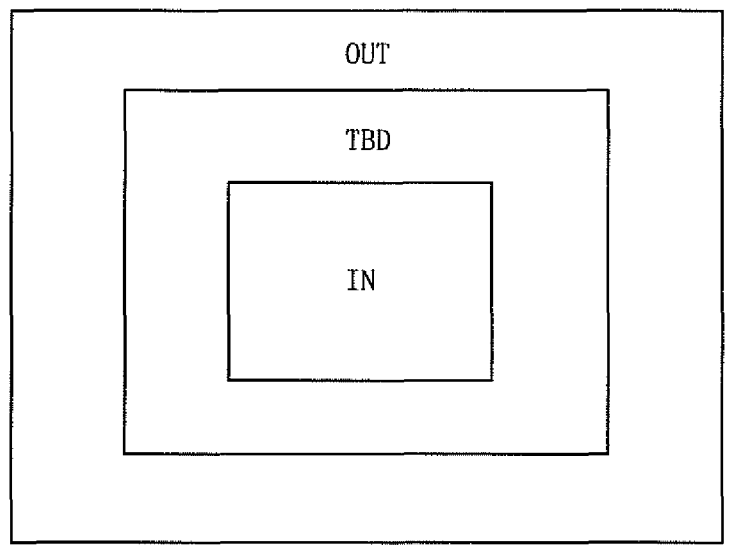
FIG. 8 is a principle diagram of the voltage value quantization plan and division in the embodiment of the present invention.

Provided that the preconfigured effective decreasing threshold of the first voltage value Vadcx is Vadcx_in and the preconfigured effective increasing threshold of the first voltage value Vadcx is Vadcx_out; the preconfigured decreasing threshold of the second preconfigured voltage value Vadcy is Vadcy_in and the preconfigured increasing threshold of the second preconfigured voltage value Vadcy is Vadcy_out, then it may quantize a constant plane and divide the constant plane into 3 areas, i.e. OUT, TBD and IN. FIG. 8 illustrates a principle diagram of the voltage value quantization plan and division in the embodiment of the present invention. The change of the first voltage value Vadcx and the second voltage value Vadcy can be expressed through the state machine. Only when the state of the state machine enters into IN area from OUT area effectively, the voltage value will be identified as appearing effective decreasing trend. Only when the state of the state machine enters into OUT area from IN area effectively, the voltage value will be identified as appearing effective increasing trend.

Figure 9:
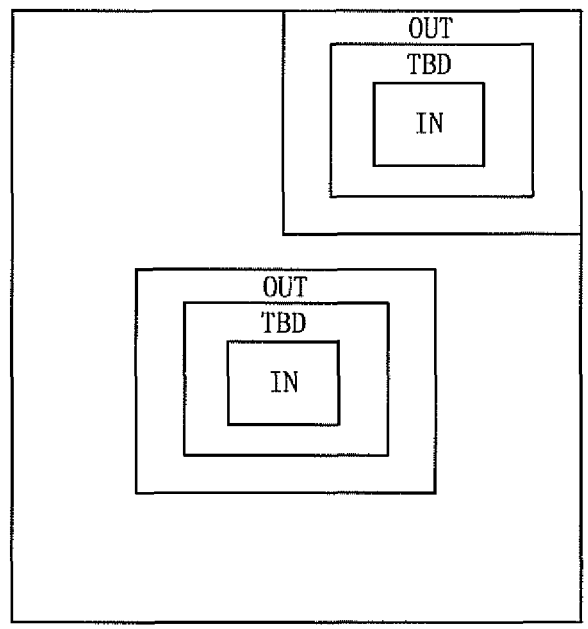
FIG. 9 is a schematic diagram for application of the principle diagram shown by FIG. 8.

FIG. 9 is a schematic diagram for application of the principle diagram shown by FIG. 8. FIG. 9 shows that the plane quantization and division principle of the voltage value shown by FIG. 8 can be applied to any actual area of the resistive touch screen.

Figure 10:
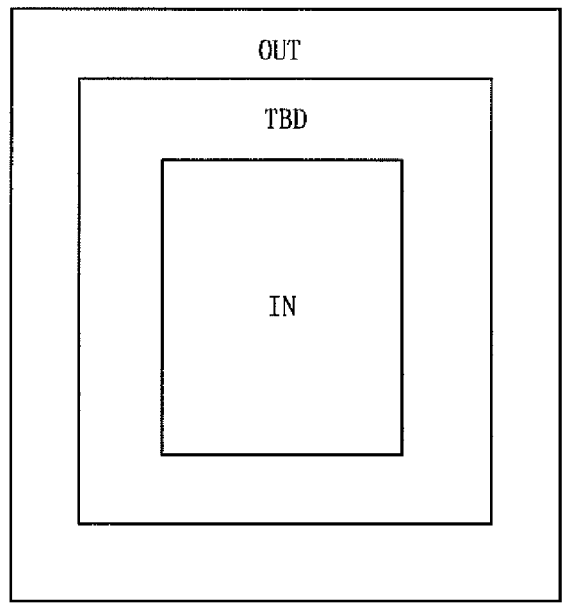
FIG. 10 is another schematic diagram for application of the principle diagram shown by FIG. 8.

FIG. 10 is another schematic diagram for application of the principle diagram shown by FIG. 8. When the resistive touch screen is very sensitive to the pressure stress factors, namely the j in the formula (3) has a large value, it means the performance of the resistive touch screen is not satisfactory. The contact and separation between the first conducting layer panel and the second conducting layer panel are not complete and there is a process of combining, which manifests as contact resistance always exists under a range of pressure, the resistance value is rather changeable, the contact is poor for light slip. At this moment, the principle shown by FIG. 8 can be applied to the whole screen of the resistive touch screen to filtrate the noise in a wider range for maximum filtration effect. However, a double-point touching operation can only detect once double-point gesture for effective magnification or effective shrinking, which make the frequency of identification to the double-point touching gesture be reduced and thus the frequency of reporting the gesture information to the application is also reduced.

Figure 11:
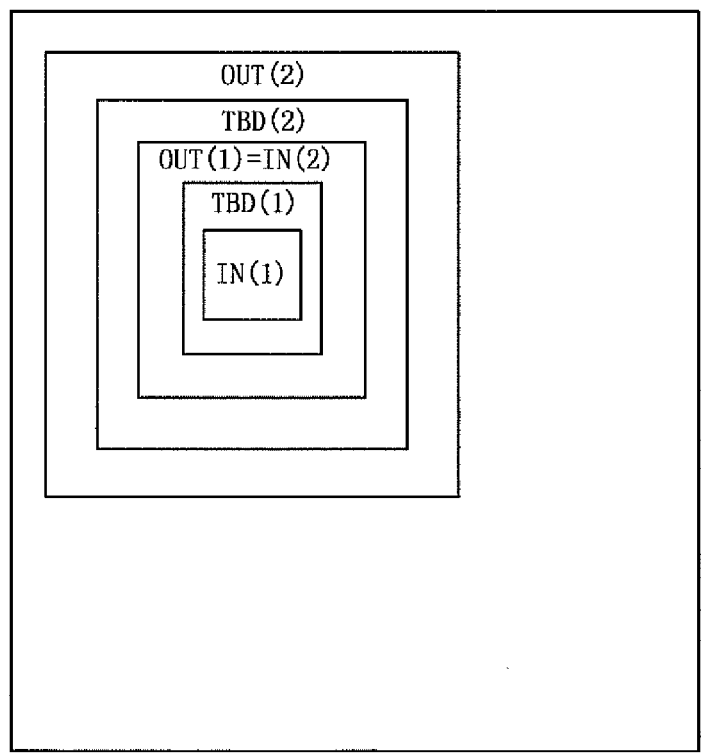
FIG. 11 is further another schematic diagram application of the principle diagram shown by FIG. 8.

FIG. 11 is another schematic diagram for application of the principle diagram shown by FIG. 8. FIG. 11 shows that the plane quantization and division principle of the voltage value shown by FIG. 8 can be applied to the whole area of the resistive touch screen in a nested way and the noise of pressure can be filtrated by the use of small range of the TBD area, that is to filtrate the jitter of the parallel effect of the two equivalent resistor caused by the finger shaking, resulting in causing the change of first voltage value Vadcx and the second voltage value Vadcy. It may be understood that for the following two cases: the performance of the resistive touch screen tends to be poor, no effect when performing light slip, the contact resistance between the two conductive will be very large; and the performance of the resistive touch screen tends to be excellent, light slip is equal to heavy slip, the contact resistance between the two conductive is constant, which is the special case of the ends of the diagram shown in FIG. 11. FIG. 11 is infinitely split into continuous space corresponding to FIG. 10. Thus, it may adjust the effective changing threshold and the number of quantized intervals. When the jitter of pressure is obvious, make it trend to FIG. 10, and when there is no jitter but insensitive, make it trend to FIG. 11. Therefore, the identification result of the error probability of gesture detection and the effective detection frequency will reach balance to make the resistive touch screen achieve the best user experience.

Figures 12, 13:
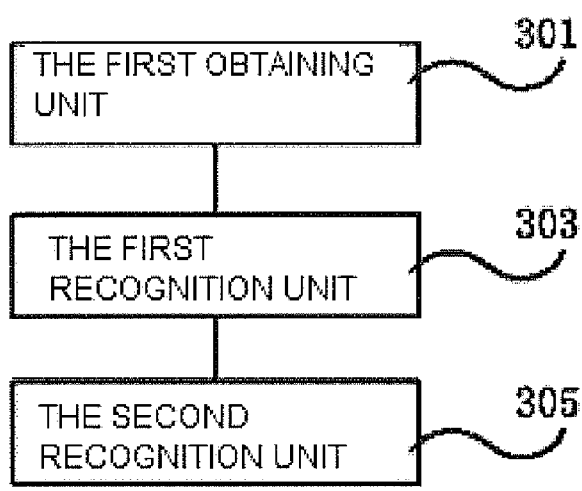
FIG. 12 is a principle diagram of the voltage value quantization plan and division when the double-point touching is the gesture for rotation in the embodiment of the present invention.
FIG. 13 is a structure diagram of an embodiment of the double-point detection device for resistive touch screen of the present invention.

FIG. 12 shows a principle diagram of the voltage value quantization plan and division when the double-point touching operation is the gesture for rotation in the embodiment of the present invention. The schematic diagram shown by FIG. 12 can be extended from the frame area of TBD and the frame area of IN in FIG. 5 and four effective areas are got by the Vadcy_out, Vadcx_out, Vadcy_in and Vadcx_in to divide the plane. For example, the situation where the first voltage value Vadcx is less than Vadcx_in and the second voltage value Vadcy is more than Vadcy_out is correspond to the XIYO area; the situation where the first voltage value Vadcx is more than Vadcx_in and the second voltage value Vadcy is less than Vadcy_out is correspond to the XOYI area, thereby processing the noise introduced by the pressure factor according the first voltage value Vadcx and the second voltage value Vadcy. When the state of the state machine enters the XOYI area from the XIYO area or enters the XIYO area from the XOYI area effectively, it identifies that the double-point touching gesture is rotation. And it can obtain the direction of double-point rotation is clockwise or counterclockwise in combination with the movement track of the mid point between the two points in two status. In the same way, just as the specific applications such as shown in FIGS. 9, 10 and 11 for FIG. 8, the plane quantization and division principle of the voltage value shown by FIG. 12 can also be applied to any actual area, whole screen of the resistive touch screen or nested application to the resistive touch screen.

FIG. 13 is a structure diagram of an embodiment of the double-point detection device for resistive touch screen of the present invention. The double-point detection device of the embodiment can be used to implement the corresponding process of the above double-point detection processing method of the present invention. The screen body of the resistive touch screen includes a first conducting layer panel and a second conducting layer panel. Two electrical connection ends on the first conducting layer panel form the X axis of a coordinates which sets on the surface screen of the resistive touch screen, two electrical connection ends on the second conducting layer panel form the Y axis of the coordinates. A first test resistor Rx is connected in series on the X axis, and a second test resistor Ry is connected in series on the Y axis. As shown in FIG. 13, the double-point detection device of the embodiment includes a first obtaining unit 301, a first identifying unit 303 and a second identifying unit 305.

Wherein, the first obtaining unit 301 is used for obtaining a first voltage value Vadcx of the first test resistor Rx and a second voltage value Vadcy of the second test resistor Ry in response to point touch on the resistive touch screen.

The first identifying unit 303 is used for identifying whether the status of the resistive touch screen is single-point touching or double point touching according to the magnitude relationship between the first voltage value Vadcx and a first reference voltage value Vadcx_ref which is obtained by the first obtaining unit 301, and the magnitude relationship between the second voltage value Vadcy and a second reference voltage value Vadcy_ref which is obtained by the first obtaining unit 301. Wherein the first reference voltage value Vadcx_ref is the voltage value of the first test resistor Rx when performing single-point touching on the resistive touch screen and generating a electric field on the X axis; the second reference voltage value Vadcy_ref is the voltage value of the second test resistor Ry when performing single-point touching on the resistive touch screen and adding generating a electric field on the Y axis.

The second identifying unit 305 is used for identifying the operation gesture according to the magnitude changing trend of the first voltage value Vadcx and the second voltage value Vadcy in the double point touching process, the operation gesture of double-point touching includes gesture with no relative motion between double points, magnification gesture, shrink gesture and rotation gestures in response to the status of the resistive touch screen which is double-point touching according to the recognition result of the first identifying unit 303.

In the resistive touch screen provided by the embodiment of the present invention, a first test resistor Rx is connected in series on the X axis on the screen body of the resistive touch screen and the second test resistor Ry is connected in series on the Y axis. Meanwhile, a first reference voltage values Vadcx_ref of the first test resistor Rx side and a second reference voltage value Vadcy_ref of the second test resistor Ry side are obtained in advance when the single-point touching is performed. When there is a point touching on the resistive touch screen, the double-point touching detection device could obtain a first voltage value Vadcx of the first test resistor Rx and a second voltage value Vadcy of the second test resistor Ry. The voltage value on the same test point will change because the first test resistor Rx is connected in series on the X axis and the second test resistor Ry is connected in series on the Y axis. Therefore, according to the magnitude relationship between the first voltage value Vadcx and the first reference voltage value Vadcx_ref, and according to the magnitude relationship between the second voltage value Vadcy and the second reference voltage value Vadcy_ref, it is available to identify whether the status of the resistive touch screen is single-point touching or double-point touching. If the status of the resistive touch screen is double-point touching, the operation gesture will be identified according to the magnitude change trend of the first voltage value Vadcx and the second voltage value Vadcy in the double-point touching process. For example, the operation gesture of double-point touching may include gesture with no relative motion between double-point, magnification gesture, shrink gesture and rotation gestures and so on. Thereby the double-point detection of the resistive touch screen is realized, the limitation of the application that the resistive touch screen can only detect single-point touching application is broken, the software applications of the resistive touch screen is enriched and the user experience is enhanced. Since the great difference between the resistive touch screen and capacitive touch screen in price, the embodiments of the invention can effectively promote the application of the resistive touch screen, which will extend the application range of the resistive touch screen and make the embodiment of the invention possess a certain practical value and significance.

According to the double-point detection device of the present invention which is just as an example instead of a limitation, the first obtaining unit 301 shown in the embodiment of FIG. 13 generates an electric field on the X axis and the voltage value of the first test resistor Rx is detected as the first reference voltage Vadcx_ref, meanwhile, a electric field is generated on the Y axis and the voltage value of the second test resistor Ry is detected as the second reference voltage Vadcy_ref when the resistive touch screen is under single-point touching status.

As an example, the first obtaining unit 301 may be an ADC, wherein, during the point touching process on the resistive touch screen, the ADC obtains a first voltage value Vadcx by sampling voltage value at the test point of the electrical connection point which is connected to the first test resistor Rx under a preconfigured sample frequency and performing analog to digital conversion; and the ADC obtains a second voltage value Vadcy by sampling voltage value at the test point of the electrical connection point which is connected to the second test resistor Ry with a preconfigured sample frequency and performing analog to digital conversion.

Figure 14:
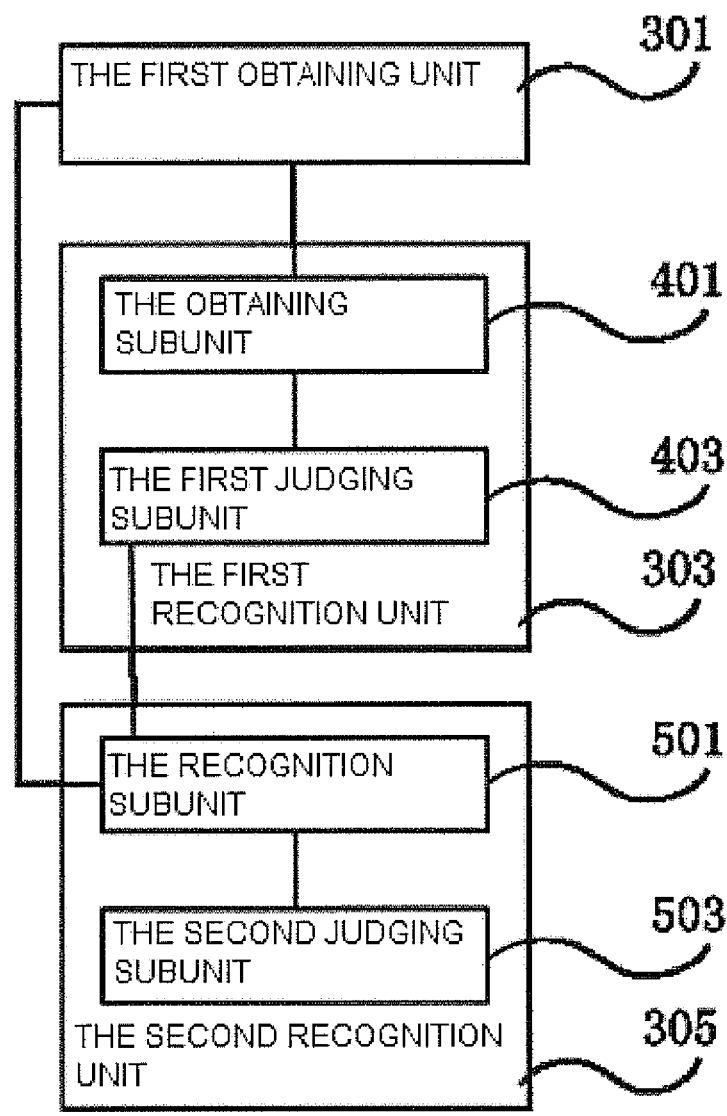
FIG. 14 is another structure diagram of an embodiment of the double-point detection device for resistive touch screen of the present invention.

FIG. 14 is another structure diagram of an embodiment of the double-point detection device for resistive touch screen of the present invention. FIGS. 7a and 7b show the flow diagram of another embodiment of the double-point detection processing method for resistive touch screen of the present invention. As shown in FIG. 14, comparing with the embodiment shown by FIG. 13, the first identifying unit 303 includes an obtaining subunit 401 and a first determining subunit 403.

Wherein, the obtaining subunit 401 is used for obtaining the absolute value of the difference between the first voltage value Vadcx and the first reference voltage value Vadcx_ref obtained by the first obtaining unit 301 and identifying whether the absolute value is larger than a first preconfigured threshold value Vadcx_t; and it is also used for obtaining the absolute value of the difference between the second voltage value Vadcy and the second reference voltage value Vadcy_ref obtained by the first obtaining unit 301 and identifying whether the absolute value is larger than a second preconfigured threshold value Vadcy_t.

The first determining subunit 403 is used for determination according to the identification results of obtaining subunit 401. If the absolute value of difference between the first voltage value Vadcx and the first reference voltage value Vadcx_ref is greater than the first threshold value Vadcx_t, and/or if the absolute value of difference between the second voltage value Vadcy and the second reference voltage value Vadcy_ref is greater than the preconfigured threshold value Vadcy_t, the status of the resistive touch screen is identified as double point touching. Otherwise, if the absolute value of difference between the first voltage value Vadcx and the first reference voltage value Vadcx_ref is not greater than the first threshold value Vadcx_t, and/or if the absolute value of difference between the second voltage value Vadcy and the second reference voltage value Vadcy_ref is not greater than the preconfigured threshold value Vadcy_t, the status of the resistive touch screen is identified as single-point touching.

In the above embodiment of the double-point touching detection device, the change of the equivalent resistor between the first conducting layer panel and the second conducting layer panel which is caused by the pressure factor when double-point touching in actual application, as well as the resulting influence to the change of the first voltage value Vadcx and the second voltage value Vadcy are fully considered. According to the performance parameters of the resistive touch screen for actual use, a reasonable first threshold Vadcx_t and a reasonable second threshold Vadcy_t are pre-configured. If the absolute value of difference between the first voltage value Vadcx and the first reference voltage value Vadcx_ref is greater than the first threshold value Vadcx_t, then identifying that the first voltage value Vadcx become bigger relative to single-point touching; if the absolute value of difference between the second voltage value Vadcy and the second reference voltage value Vadcy_ref is greater than the preconfigured threshold value Vadcy_t, the status of the resistive touch screen is identified as double-point touching, then identifying that the second voltage value Vadcy become bigger relative to single-point touching. Hence, the current status of the resistive touch screen will be known as double-point touching so long as one of first voltage value Vadcx and the second voltage value Vadcy changes, thus the determination for double-point detection in the condition of pressure factor in the actual application is realized and the present invention is more suitable for practical use.

In the first embodiment of the resistive touch screen of the present invention, the first electrical connection end XL of the two electrical connection ends on the first conducting layer panel is connected to the positive voltage, while the second electrical connection end XR is connected to ground Vdd; the third electrical connection end YU of the two electrical connection ends on the second conducting layer panel is connected to the positive voltage, while the fourth electric connection end YD is connected to ground Vdd; the first test resistor Rx is connected in series between the second electrical connection end XR and the first test point of the second electrical connection end XR, and the second test resistor Ry is connected in series between the fourth electrical connection end YD and the second test point of the fourth electrical connection end YD. In the second embodiment of the resistive touch screen of the present invention, the first electrical connection end XL of the two electrical connection ends on the first conducting layer panel is connected to ground Vdd, while the second electrical connection end XR is connected to the positive voltage; the third electrical connection end YU of the two electrical connection ends on the second conducting layer panel is connected to ground Vdd, while the fourth electric connection end YD is connected to the positive voltage; the first test resistor Rx is connected in series between the first electrical connection end XL and the third test point of the first electrical connection end XL, and the second test resistor Ry is connected in series between the third electrical connection end YU and the fourth test point of the third electrical connection end YU.

Referring to FIG. 14 again, it is another embodiment of the resistive touch screen of the present invention, which is applied in the first and second embodiments of the resistive touch screen of the present invention. The second identifying unit 305 includes a identifying subunit 501 and a second determining subunit 503.

Wherein, in response to the status of the resistive touch screen which is double-point touching according to the identification result of the first determining subunit 403, the identifying subunit 501 is used for identifying the changing trend of the first voltage value Vadcx and the second voltage value Vadcy during the double point touching process identification result determining.

The second determining subunit 503, according to the identification result of the identifying subunit 501, if both the first voltage value Vadcx and the second voltage value Vadcy appear no effective trend, it identifies that the operation gesture of the double point touching is the gesture with no relative motion between double points. If the first voltage value Vadcx appears an effective increasing trend while the second voltage value Vadcy appears no effective trend, or if the first voltage value Vadcx appears no effective trend while the second voltage value Vadcy appears an effective increasing trend during the double point touching process, it identifies the operation gesture of the double point touching is the gesture of double point magnification. If the first voltage value Vadcx appears an effective decreasing trend while the second voltage value Vadcy appears no effective trend, or if the first voltage value Vadcx appears no effective trend while the second voltage value Vadcy appears an effective decreasing trend during the double point touching process, it identifies the operation gesture of the double point touching is the gesture of double point shrinking. If the first voltage value Vadcx appears an effective increasing or decreasing trend and the second voltage value Vadcy also appears an effective increasing or decreasing trend during the double point touching process, it identifies the operation gesture of the double point touching is the gesture of double point rotation.

In addition, in the third embodiment of the resistive touch screen of the present invention, a first electrical connection end XL of the two electrical connection ends on the first conducting layer panel is connected to ground Vdd, while a second electrical connection end XR is connected to the positive voltage; a third electrical connection end YU of the two electrical connection ends on the second conducting layer panel is connected to ground Vdd, while a fourth electrical connection end YD is connected to the positive voltage; the first test resistor Rx is connected in series between the second electrical connection end XR and the first test point of the second electrical connection end XR, and the second test resistor Ry is connected in series between the fourth electrical connection end YD and the second test point of the fourth electrical connection end YD. In the fourth embodiment of the resistive touch screen of the present invention, the first electrical connection end XL of the two electrical connection ends on the first conducting layer panel is connected to the positive voltage, while the second electrical connection end XR is connected to ground Vdd; the third electrical connection end YU of the two electrical connection ends on the second conducting layer panel is connected to the positive voltage, while the fourth electric connection end YD is connected to ground Vdd; the first test resistor Rx is connected in series between the first electrical connection end XL and the third test point of the first electrical connection end XL, the second test resistor Ry is connected in series between the third electrical connection end YU and the fourth test point of the third electrical connection end YU.

Accordingly, when the embodiment shown by the FIG. 14 is applied to the third embodiment and the fourth embodiment of the present invention, the identifying subunit 501 is used for identifying the changing trend of the first voltage value Vadcx and the second voltage Vadcy obtained by the first obtaining unit 301 during the double point touching process according to the identification result of the first determining subunit 403 in response to the status of the resistive touch screen which is double-point touching.

The second determining subunit 503 is used for determination according to the identification result of the identifying subunit 501. If both the first voltage value Vadcx and the second voltage value Vadcy appear no effective trend, it identifies the operation gesture of the double point touching is the gesture with no relative motion between double points. If the first voltage value Vadcx appears an effective increasing trend while the second voltage value Vadcy appears no effective trend, or if the first voltage value Vadcx appears no effective trend while the second voltage value Vadcy appears an effective increasing trend during the double point touching process, it identifies the operation gesture of the double point touching is the gesture of double point shrinking. If the first voltage value Vadcx appears an effective decreasing trend while the second voltage value Vadcy appears no effective trend, or if the first voltage value Vadcx appears no effective trend while the second voltage value Vadcy appears an effective decreasing trend during the double point touching process, it identifies the operation gesture of the double point touching is the gesture of double point magnification. If the first voltage value Vadcx appears an effective increasing or decreasing trend and the second voltage value Vadcy also appears an effective increasing or decreasing trend during the double point touching process, it identifies the operation gesture of the double point touching is the gesture of double point rotation.

In addition, corresponding to the double-point detection processing method for the resistive touch screen of the embodiment of the present invention, under the condition that there is only one electrical connection end on one of the first conducting layer panel and the second conducting layer panel which accesses are reverse connection in comparison to the embodiment shown by FIGS. 5 and 6, and in any connection situation of the electrical connection end between the first conducting layer panel and the second conducting layer panel in the above embodiments, the first test resistor Rx could be set in series between the second electrical connection end XR and the first test point of the second electrical connection end XR, or the first test resistor Rx could be set in series between the first electrical connection end XL and the third test point of the first electrical connection end XL. In the same way, the second test resistor Ry could be set in series between the fourth electrical connection end YD and the second test point of the fourth electrical connection end YD, or the second test resistor Ry could be set in series between the third electrical connection end YU and the fourth test point of the third electrical connection end YU. In any possible embodiments, the skilled in the art is able to achieve the identification to the operation gesture of the double-point touching by the identifying subunit 501 and the second determining subunit 503 of the second identifying unit 305, and it will not explained more here.

Figure 15:
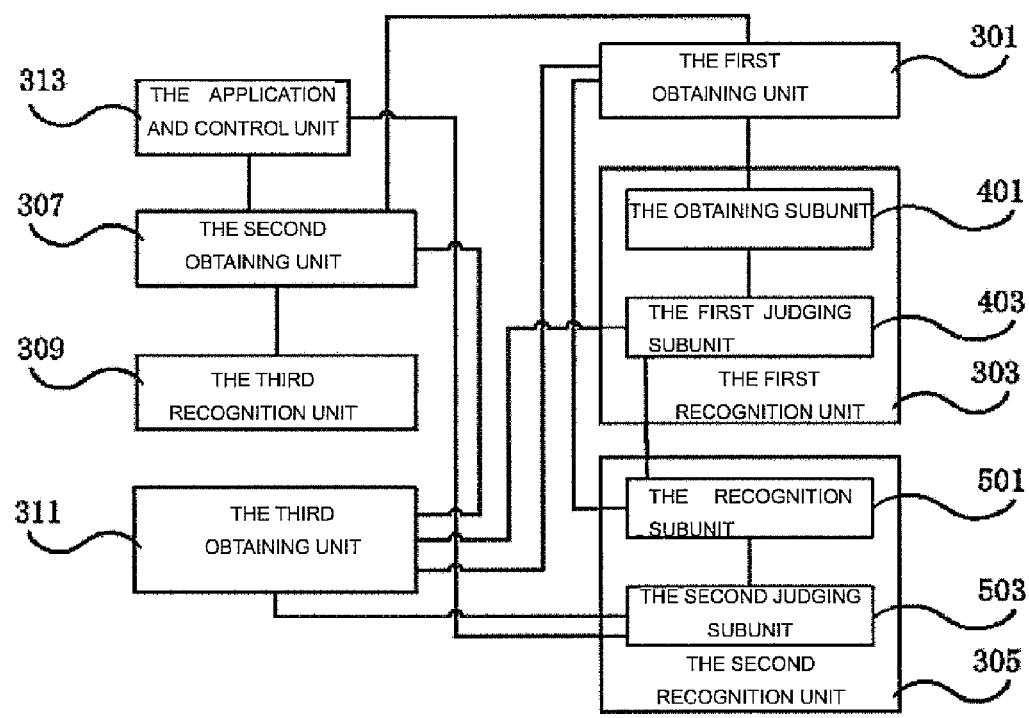
FIG. 15 is further another structure diagram of an embodiment of the double-point detection device for resistive touch screen of the present invention.

FIG. 15 is another structure diagram of an embodiment of the double-point detection device for resistive touch screen of the present invention. As shown in FIG. 15, comparing to the double-point detection device of the embodiment mentioned above and corresponding to the double-point detection processing method of this embodiment mentioned above, the double-point detection device may further include a second obtaining unit 307 and a third identifying unit 309.

Wherein, the second obtaining unit 307 is used for obtaining the movement track of the mid point between the two points during the process of double-point touching. Specifically, as the double-point touching can be regarded as the touching of the mid point between the two points, the second obtaining unit 307 can also obtain the X position and the Y position (x, y) of the mid point in the coordinate system as the position of the mid point on the resistive touch screen according to the first voltage value Vadcx and the second voltage value Vadcy obtained by the first obtaining unit 301 and the width of the screen body in X axis and Y axis based on the way of obtaining the position of the touching point on the resistive touch screen when single-point touching.

The third identifying unit 309 is used for identifying whether the direction of rotation gesture appeared by the double point is clockwise or counterclockwise according to the effective changing trend of the first voltage value Vadcx and the second voltage value Vadcy obtained by the second determining subunit 503 and the movement track information of the mid point between the double points obtained by the second obtaining unit 307.

According to another embodiment the double-point detection device of the present invention which is just another example but not a limitation, corresponding to the double-point detection of the embodiment of the present invention, the first obtaining unit 301 may analyze the magnitude relationship between the first voltage Vadcx and the first reference voltage value Vadcx_ref as well as the magnitude relationship between the second voltage value Vadcy and the second reference voltage value Vadcy_ref of each sampling point in each preconfigured analysis step. Accordingly, the first identifying unit 303 analyzes whether the status of the resistive touch screen is single-point touching or double-point touching respectively. The second identifying unit 305 identifies the changing trend of the first voltage value Vadcx and the second voltage value Vadcy in each preconfigured analysis step, and it also identifies the operation gesture of the double point touching and outputs the result according to the changing trend of the first voltage value Vadcx and the second voltage value Vadcy in each preconfigured analysis step.

As an example, if the increase of the first voltage value Vadcx reaches to a preconfigured effective increasing threshold in each sampling point in the preconfigured analysis step, then the first voltage value Vadcx appears an effective increasing trend. If the decrease of the first voltage value Vadcx reaches to a preconfigured effective decreasing threshold in each sampling point in the preconfigured analysis step, then the first voltage value Vadcx appears an effective decreasing trend. If the increase of the second voltage value Vadcy reaches to a preconfigured effective increasing threshold in each sampling point in the preconfigured analysis step, then the second voltage value Vadcy appears effective an increasing trend. If the decrease of the second voltage value Vadcy reaches to a preconfigured effective decreasing threshold in each sampling point in the preconfigured analysis step, then the first voltage value Vadcy appears an effective decreasing trend.

In order to avoid the misdetermination to the double-point gesture caused by the reduction of the effectiveness of the point-by-point small trend analyzed based on the sample point in the preconfigured step, in the embodiments of the present invention, according to change range of the touching force, the appropriate thresholds for effective changing including the increasing threshold and the decreasing threshold are set to count, to analyze and to filter the sampling points in a point-by-point small trend in the preconfigured analysis step and output the effective increasing or decreasing trend of the first voltage value Vadcx and the second voltage value Vadcy based on each preconfigured analysis step. The frequent changes of the effective changing trend caused by the noise because of the uneven pressure force are thereby filtered through division and quantification to the first voltage value Vadcx and the second voltage value Vadcy.

In addition, referring to FIG. 15 again, in another embodiment of the double-point detection device for the resistive touch screen of the present invention, it could include a third obtaining unit 311. According to the identification result of the first identifying unit 303 or its first determining subunit 403, in response to the status of the resistive touch screen when it is single-point touching, the third obtaining unit 311 obtains the voltage value generated by the touching point of the single-point touching on the first conducting layer panel according to the first voltage value Vadcx and a positive voltage value which is connected by an electrical connection end on the second conducting layer obtained by the first obtaining unit 301. The third obtaining unit 311 obtains the voltage value generated by the touching point on the second conducting layer panel according to the second voltage value Vadcy and a positive voltage value which is connected by an electrical connection end on the first conducting layer obtained by the first obtaining unit 301. Accordingly, the second obtaining unit 307 is also used to obtain the X position and the Y position (x, y) of the mid point of the two points in the coordinate system as the position of the representative touching point on the resistive touch screen according to the voltage value Vadcx and Vadcy obtained by the third obtaining unit 311 and the width of the screen body in X axis and Y axis. The voltage value Vadcx and Vadcy are generated by the touching point on the first conducting layer panel and the second conducting layer panel.

Furthermore, referring to FIG. 15 again, in another embodiment of the resistive touch screen of the present invention, it may still include an applying and controlling unit 313 for controlling the screen display of the applications on the resistive touch screen according to the position information of the touch point on the screen body of the resistive touch screen obtained by the second obtaining unit 307 or the operation gesture information of the double point touching obtained by the second identifying unit 305 or the second determining subunit 503 thereof.

Figure 16:
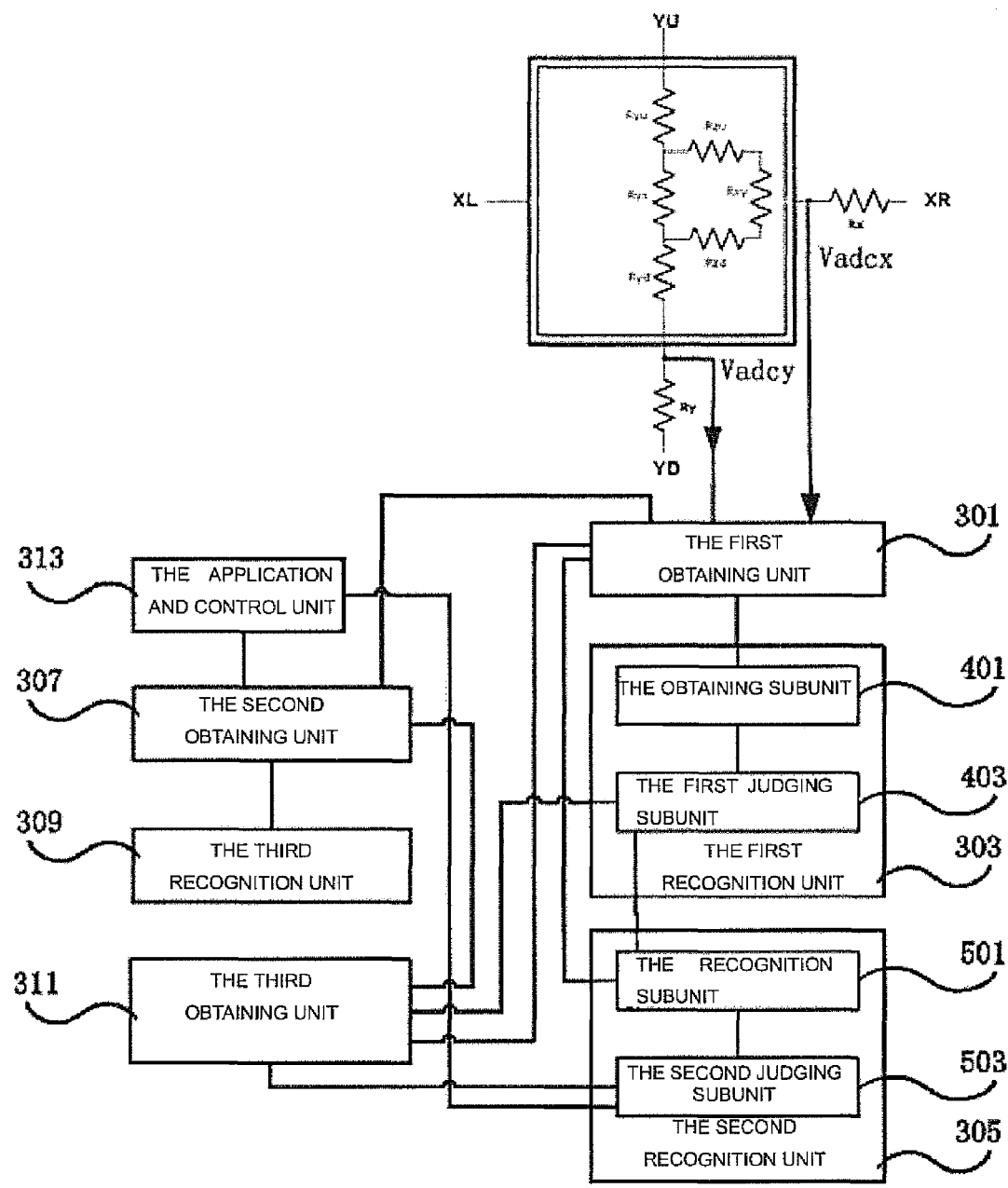
FIG. 16 is a structure diagram of an embodiment of the resistive touch screen of the present invention.

FIG. 16 is a structure diagram of an embodiment of the resistive touch screen of the present invention. As shown in FIG. 16, the screen body of the resistive touch screen of the present invention includes a first conducting layer panel and a second layer panel, two electrical connection ends on the first conducting layer panel form the X axis of a coordinates which sets on the surface screen of the resistive touch screen, two electrical connection ends on the second conducting layer panel form the Y axis of the coordinates. A first test resistor Rx is connected in series on the X axis, and a second test resistor Ry is connected in series on the Y axis. The resistance value of the first test resistor Rx and the second test resistor Ry are preferred to be able to show the change of the resistance value of the equivalent resistor of X axis and Y axis of the screen body. In addition, the resistive touch screen includes the double-point detection device of the resistive touch screen in any embodiment mentioned above. For the sake of simplicity, FIG. 16 illustrates a double-point detection device which uses the structure of an embodiment shown in FIG. 15 only as an example. Regarding to the resistive touch screen which comprises the structure of the double-point detection device of other embodiment of the present invention will not be shown as the connection relationships are similar.

In the resistive touch screen provided by the present invention, the first test resistor Rx is connected in series on the X axis on the screen body of the resistive touch screen and the second test resistor Ry is connected in series on the Y axis. Meanwhile, a first reference voltage values Vadcx_ref of the first test resistor Rx side and a second reference voltage value Vadcy_ref of the second test resistor Ry side are obtained in advance when the single-point touching is performed. When there is point touch on the resistive touch screen, obtain a first voltage value Vadcx of the first test resistor Rx and a second voltage value Vadcy of the second test resistor Ry. The voltage value on the same test point will change because the first test resistor Rx is connected in series on the X axis and the second test resistor Ry is connected in series on the Y axis. Therefore, according to the magnitude relationship between the first voltage value Vadcx and the first reference voltage value Vadcx_ref, and according to the magnitude relationship between the second voltage value Vadcy and the second reference voltage value Vadcy_ref, it is available to identify whether the status of the resistive touch screen is single-point touching or double-point touching. If the status of the resistive touch screen is double-point touching, the operation gesture will be identified according to the magnitude change trend of the first voltage value Vadcx and the second voltage value Vadcy in the double-point touching process. For example, the operation gesture of double-point touching may include gesture with no relative motion between double-point, magnification gesture, shrink gesture and rotation gestures and so on. Thereby the double-point detection of the resistive touch screen is realized, the limitation of the application that the resistive touch screen can only detect single-point touching application is broken, the software applications of the resistive touch screen is enriched and the user experience enhanced. Since the great difference between the resistive touch screen and capacitive touch screen in price, the embodiments of the invention can effectively promote the application of the resistive touch screen, which will extend the application range of the resistive touch screen and make the embodiment of the invention possess a certain practical value and significance.

The embodiments in the present specification are described in a progressive way. The emphasis of each embodiment described is the difference from other embodiments. The same or similar portions among each embodiment may be referred to each other. With respect to the embodiments for the device and the resistive touch screen, because they are substantially corresponding to the embodiments of the method, the description is in a simple way. Thus, the relevant parts may be referred to the corresponding parts described in the embodiments of the method.

The ordinarily skilled in the art can understand that there are many means could be used to achieve the method, the device thereof and the resistive touch screen device of the present invention. For example, the method device and the resistive touch screen device of the present invention could be achieved by using software, hardware, firmware or their combination. The order of the steps of the method is only to illustrate the present invention. The steps of the method of the present invention are not limited to the above mentioned order unless being otherwise specified. Moreover, in some embodiments, all or parts of steps of the above mentioned embodiments could be achieved by using hardware relate to the programmed instruction. The program could be stored in a computer readable storage medium, when the program is executed, then the step of the above mentioned method embodiment will be performed. The storage medium includes ROM, RAM, disc or CD and other storage mediums which could store the programmed instruction.

The ordinarily skilled in the art can also understand that the constituent units of each embodiment of the resistive touch screen and the double-point detection device can be realized by software and hardware as well. In addition, the constituent units of the resistive touch screen and the double-point detection device which is described in the embodiments of the present invention above are not a prerequisite way or only way to realize the embodiments of the present invention. For example, a wiring strobe unit can be set on the X axis and Y axis for applying an electric field in the resistive touch screen and a circuit detection unit for detecting whether there is a touch occurred, etc. In addition, the constituent units of the double-point detection device can be distributed in other constituent units of the resistive touch screen according to actual demands, and the set position of each constituent unit can be adjusted according to actual demands. For example, the first obtaining unit 301 and the applying and controlling unit 313 can also be set in the resistive touch screen. Several constituent units can be combined into a single unit to realize the embodiments or a constituent unit can also be divided into several subunits to realize the embodiments. In addition, the connecting relationship among the constituent units of the double-point detection device is only an example for the relationship of the information flow of the present invention, which is not limited to the physical connection and is not a prerequisite way or only way to realize the embodiments of the present invention.

The embodiments of the present invention can achieve the following advantageous technical effects:

it can identify whether the status of the resistive touch screen is single-point touching or double-point touching;

if the status of the resistive touch screen is double-point touching, it can identify the operation gesture according to the magnitude changing trend of the first voltage value Vadcx and the second voltage value Vadcy in the double-point touching process; the operation gesture of double-point touching includes gesture with no relative motion between double-point, magnification gesture, shrink gesture and rotation gestures and so on; thereby the double-point detection of the resistive touch screen is realized, the limitation of the application that the resistive touch screen can only detect single-point touching application is broken, the software applications of the resistive touch screen is enriched and the user experience is enhanced. Since the great difference between the resistive touch screen and capacitive touch screen in price, the embodiments of the invention can effectively promote the application of the resistive touch screen, which will extend the application range of the resistive touch screen and make the embodiment of the invention possess a certain practical value and significance;

the determination for double-point detection in the condition of pressure factor in the actual application is realized and the present invention is more suitable for practical use;

the equations do not involve complex calculations and there are fewer calculations, which makes it suitable for the implementation scenario by various kinds of hardware and software.

Although typical embodiments and descriptions of the specific implementation have been given with the above description and the figures, it is appreciated that not all the embodiments and implementations are disclosed in this disclosure. It is obvious for the skilled in the art that other changes based on the spirit of this invention may also be made. The purposes for choosing and describing the embodiments are to introduce the principle and applications of this invention better and to make the skilled in the art to understand this invention so as to make various amendments and embodiments which are adapted to the specific applications.

The invention claimed is:

1. A double-point detection method for resistive touch screen, wherein the screen body of the resistive touch screen includes a first conducting layer panel and a second conducting layer panel; two electrical connection ends on the first conducting layer panel form the X axis of a coordinates which sets on the surface of the resistive touch screen; two electrical connection ends on the second conducting layer panel form the Y axis of the coordinates; a first test resistor Rx is set in series on the X axis, and a second test resistor Ry is set in series on the Y axis; the method comprising the steps of:

responding to the point touch existing on the resistive touch screen, acquiring a first voltage values Vadcx of the first test resistor Rx and a second voltage values Vadcy of the second test resistor Ry;

identifying whether the status of the resistive touch screen is single-point touching or double-point touching according to the magnitude relationship between the first voltage value Vadcx and a first reference voltage value Vadcx_ref, and the magnitude relationship between the second voltage value Vadcy and a second reference voltage value Vadcy_ref; wherein the first reference voltage value Vadcx_ref is the voltage value of the first test resistor Rx when performing single-point touching on the resistive touch screen and generating an electric field on the X axis; the second reference voltage value Vadcy_ref is the voltage value of the second test resistor Ry when performing single-point touching on the resistive touch screen and generating an electric field on the Y axis;

responding to the status of the resistive touch screen which is double-point touching, identifying the operation gesture according to the magnitude change trends of the first voltage value Vadcx and the second voltage value Vadcy in the double-point touching process; the operation gesture of double-point touching includes the gesture with no relative motion between the double-point, magnification gesture, shrink gesture and rotation gestures.

2. The method of claim 1, wherein the resistance value of the first test resistor Rx is equal to the resistance value of the equivalent resistor on the X axis of the screen body, and/or the resistance value of the second test resistor Ry is equal to the resistance value of the equivalent resistor on the Y axis of the screen body.

3. The method of claim 1, further comprising the step of:
setting the resistive touch screen to the single-point touching status, generating an electric field on the X axis and detecting the voltage value on the first test resistor Rx as the first reference voltage Vadcx_ref, as well as generating an electric field on the Y axis and detecting the voltage value on the second test resistor Ry as the second reference voltage Vadcy_ref.

4. The method of claim 3, wherein the steps of acquiring the first voltage value Vadcx and the second voltage value Vadcy comprise:
in the point touching process on the resistive touch screen, using an analog digital converter (ADC) to acquire a first voltage value Vadcx by sampling the test point of the electrical connection point which is connected to the first test resistor Rx with a preconfigured first voltage value Vadcx and performing analog to digital conversion; and using the analog digital converter to acquire a second voltage value Vadcy by sampling the test point of the electrical connection point which is connected to the second test resistor Ry with a preconfigured second voltage value Vadcy and performing analog to digital conversion.

5. The method of claim 3, wherein according to the magnitude relationship between the first voltage value Vadcx and a first reference voltage value Vadcx_ref, and the magnitude relationship between the second voltage value Vadcy and a second reference voltage value Vadcy_ref, the step of identifying the status of the resistive touch screen is single-point touching or double-point touching comprises:
obtaining the absolute value of the difference between the first voltage value Vadcx and the first reference voltage value Vadcx_ref and identifying whether the absolute value is larger than a first preconfigured threshold value Vadcx_t, and obtaining the absolute value of the difference between the second voltage value Vadcy and the second reference voltage value Vadcy_ref and identifying whether the absolute value is larger than a second preconfigured threshold value Vadcy_t;
if the absolute value of the difference between the first voltage value Vadcx and the first reference voltage value Vadcx_ref is greater than the first threshold value Vadcx_t, and/or if the absolute value of the difference between the second voltage value Vadcy and the second reference voltage value Vadcy_ref is greater than the preconfigured threshold value Vadcy_t, identify the status of the resistive touch screen is double-point touching;
otherwise, if the absolute value of the difference between the first voltage value Vadcx and the first reference voltage value Vadcx_ref is not greater than the first threshold value Vadcx_t, and/or if the absolute value of difference between the second voltage value Vadcy and the second reference voltage value Vadcy_ref is not greater than the preconfigured threshold value Vadcy_t, identify the status of the resistive touch screen is single-point touching.

6. The method of claim 3, wherein a first electrical connection end XL of the two electrical connection ends on the first conducting layer panel is connected to the positive voltage, and a second electrical connection end XR is connected to ground Vdd; a third electrical connection end YU of the two electrical connection ends on the second conducting layer panel is connected to the positive voltage, and a fourth electrical connection end YD is connected to ground Vdd; the first test resistor Rx is connected in series between the second electrical connection end XR and the first test point of the second electrical connection end XR, the second test resistor Ry is connected in series between the fourth electrical connection end YD and the second test point of the fourth electrical connection end YD;
or, the first electrical connection end XL of the two electrical connection ends on the first conducting layer panel is connected ground to Vdd, while the second electrical connection end XR is connected to the positive voltage; the third electrical connection end YU of the two electrical connection ends on the second conducting layer panel is connected to ground Vdd, while the fourth electric connection end YD is connected to the positive voltage; the first test resistor Rx is connected in series between the first electrical connection end XL and the third test point of the first electrical connection end XL, the second test resistor Ry is connected in series between the third electrical connection end YU and the fourth test point of the third electrical connection end YU;

according to the magnitude change trend of the first voltage value Vadcx and the second voltage Vadcy during the double-point touching process, the identification step of the gesture of double-point touching comprises:
identifying the magnitude change trend of the first voltage value Vadcx and the second voltage value Vadcy during the double-point touching process;
if both the first voltage value Vadcx and the second voltage value Vadcy appear no effective trend, it identifies the operation gesture of the double-point touching is the gesture with no relative motion between double-point;
if the first voltage value Vadcx appears an effective increasing trend while the second voltage value Vadcy appears no effective trend, or the first voltage value Vadcx appears no effective trend while the second voltage value Vadcy appears an effective increasing trend during the double-point touching process, it identifies the operation gesture of the double-point touching is the gesture for magnifying;

if the first voltage value Vadcx appears an effective decreasing trend while the second voltage value Vadcy appears no effective trend, or the first voltage value Vadcx appears no effective trend while the second voltage value Vadcy appears an effective decreasing trend during the double-point touching process, it identifies the operation gesture of the double-point touching is the gesture for shrinking;

if the first voltage value Vadcx appears an effective increasing or decreasing trend and the second voltage value Vadcy appears an effective increasing or decreasing trend during the double-point touching process, it identifies the operation gesture of the double-point touching is the gesture for rotation.

7. The method of claim 6, further comprising the steps of:
acquiring the movement track of the mid point between the double-point during the process of double-point touching;
identifying the direction of rotation gesture appeared by the double-point is clockwise or counterclockwise according to the effective trend of the first voltage value Vadcx and the second voltage value Vadcy and the movement track information of the mid point between the double-point.

8. The method of claim 7, wherein the step of identifying the status of the resistive touch screen is single-point touching or double-point touching comprises:
with the preconfigured analysis step as the unit, analyzing the magnitude relationship between the first voltage Vadcx and the first reference voltage value Vadcx_ref as well as the magnitude relationship between the second voltage value Vadcy and the second reference voltage value Vadcy_ref of each sampling point in each preconfigured analysis step;
analyzing the status of the resistive touch screen is single-point touching or double-point touching in each preconfigured analysis step respectively;
according to the magnitude change trend of the first voltage value Vadcx and the second voltage value Vadcy, the step of identifying the operation gesture of double-point touching comprises:
with the preconfigured analysis step as the unit, identifying the magnitude change trend of the first voltage value Vadcx and the second voltage value Vadcy;
according to the magnitude change trend of the first voltage value Vadcx and the second voltage value Vadcy in each preconfigured analysis step, identifying the operation gesture of the double-point touching.

9. The method of claim 8, wherein if the first voltage value Vadcx increases to a preconfigured effective increasing threshold in each sampling point in the preconfigured analysis step, then the first voltage value Vadcx appears an effectively increasing trend; if the first voltage value Vadcx decreases to a preconfigured effective decreasing threshold in each sampling point in the preconfigured analysis step, then the first voltage value Vadcx appears an effectively decreasing trend;
if the second voltage value Vadcy increases to a preconfigured effective increasing threshold in each sampling point in the preconfigured analysis step, then the second voltage value Vadcy appears an effectively increasing trend; if the second voltage value Vadcy decreases to a preconfigured effective decreasing threshold in each sampling point in the preconfigured analysis step, then the first voltage value Vadcy appears an effectively decreasing trend.

10. The method of claim 9, further comprising the steps of:
responding to the status of the resistive touch screen when it is single-point touching, acquire the voltage value generated by the touching point of the single-point touching on the first conducting layer panel according to the first voltage value Vadcx and the value of the positive voltage which is connected by an electrical connection end on the second conducting layer panel; and acquire the voltage value generated by the touching point on the second conducting layer panel according to the second voltage value Vadcy and a positive voltage value which is connected by an electrical connection end on the first conducting layer panel; and
according to the voltage value generated by the touching point on the first conducting layer panel and the second conducting layer panel and the width of the screen body in X axis and Y axis, acquire the X position and Y position (x, y) of the touching point in the coordinate system as the position of the touching point on the resistive touch screen.

11. The method of claim 10, further comprising the step of:
controlling the screen display of the applications on the resistive touch screen according to the position information of the touching point on the screen body of the resistive touch screen or the operation gesture information of the double-point touching.

12. The method of claim 3, wherein the first electrical connection end XL of the two electrical connection ends on the first conducting layer panel is connected to ground Vdd, while a second electrical connection end XR is connected to the positive voltage; a third electrical connection end YU of the two electrical connection ends on the second conducting layer panel is connected to ground Vdd, while a fourth electrical connection end YD is connected to the positive voltage; the first test resistor Rx is connected in series between the second electrical connection end XR and the first test point of the second electrical connection end XR, the second test resistor Ry is connected in series between the fourth electrical connection end YD and the second test point of the fourth electrical connection end YD;
the first electrical connection end XL of the two electrical connection ends on the first conducting layer panel is connected to the positive voltage, while the second electrical connection end XR is connected to ground Vdd; the third electrical connection end YU of the two electrical connection ends on the second conducting layer panel is connected to the positive voltage, while the fourth electric connection end YD is connected to ground Vdd; the first test resistor Rx is connected in series between the first electrical connection end XL and the third test point of the first electrical connection end XL, the second test resistor Ry is connected in series between the third electrical connection end YU and the fourth test point of the third electrical connection end YU;
according to the magnitude change trend of the first voltage value Vadcx and the second voltage Vadcy during the double-point touching process, the identification step of the gesture of double-point touching comprises:
identifying the magnitude change trend of the first voltage value Vadcx and the second voltage value Vadcy during the double-point touching process;
if both the first voltage value Vadcx and the second voltage value Vadcy appear no effective trend, it identifies the operation gesture of the double-point touching is the gesture with no relative motion between double-point;

if the first voltage value Vadcx appears an effective increasing trend while the second voltage value Vadcy appears no effective trend, or the first voltage value Vadcx appears no effective trend while the second voltage value Vadcy appears an effective increasing trend during the double-point touching process, it identifies the operation gesture of the double-point touching is the gesture for shrinking;

if the first voltage value Vadcx appears an effective decreasing trend while the second voltage value Vadcy appears no effective trend, or the first voltage value Vadcx appears no effective trend while the second voltage value Vadcy appears an effective decreasing trend during the double-point touching process, it identifies the operation gesture of double-point touching is the gesture for magnifying;

if the first voltage value Vadcx appears an effective increasing or decreasing trend and the second voltage value Vadcy appears an effective increasing or decreasing trend during the double-point touching process, it identifies the operation gesture of double-point touching is the gesture for rotation.

13. A double-point detection device for resistive touch screen, the screen body of the resistive touch screen includes a first conducting layer panel and a second conducting layer panel; two electrical connection ends on the first conducting layer panel form the X axis of a coordinates which sets on the surface screen of the resistive touch screen, and two electrical connection ends on the second conducting layer panel form the Y axis of the coordinates; wherein a first test resistor Rx is connected in series on the X axis, and a second test resistor Ry is connected in series on the Y axis, the device:
   a first obtaining unit used for obtaining a first voltage values Vadcx of a first test resistor Rx and a second voltage values Vadcy of a second test resistor Ry in response to the point touch existing on the resistive touch screen;
   a first identifying unit used for identifying whether the status of the resistive touch screen is single-point touching or double-point touching according to the magnitude relationship between the first voltage value Vadcx and a first reference voltage value Vadcy_ref, and the magnitude relationship between the second voltage value Vadcy and a second reference voltage value Vadcy_ref; wherein the first reference voltage value Vadcy_ref is the voltage value of the first test resistor Rx when performing single-point touching on the resistive touch screen and generating an electric field on the X axis; the second reference voltage value Vadcy_ref is the voltage value of the second test resistor Ry when performing single-point touching on the resistive touch screen and generating an electric field on the Y axis;
   a second identifying unit used for identifying the operation gesture according to the magnitude change trends of the first voltage value Vadcx and the second voltage value Vadcy in the double-point touching process, the operation gesture of double-point touching includes gesture with no relative motion between double-point, magnification gesture, shrink gesture and rotation gestures in response to the status of the resistive touch screen which is double-point touching according to the recognition result of the first identifying unit.

14. The device of claim 13, wherein the resistance value of the first test resistor Rx is equal to the resistance value of the equivalent resistor on the X axis of the screen body, and/or the resistance value of the second test resistor Ry is equal to the resistance value of the equivalent resistor on the Y axis of the screen body.

15. The device of claim 14, wherein the first obtaining unit is used for generating an electric field on the X axis and detecting the voltage value on the first test resistor Rx as the first reference voltage Vadcx_ref, as well as generating an electric field on the Y axis and detecting the voltage value on the second test resistor Ry as the second reference voltage Vadcy_ref when the resistive touch screen is under the single-point touching status.

16. The device of claim 15, wherein the first obtaining unit is ADC, which obtains a first voltage value Vadcx by sampling the test point of the electrical connection point which is connected to the first test resistor Rx with a preconfigured sample frequency and performing the analog to digital conversion in the point touching process on the resistive touch screen; and obtains a second voltage value Vadcy by sampling the test point of the electrical connection point which is connected to the second test resistor Ry with a preconfigured sample frequency and performing the analog to digital conversion.

17. The device of claim 16, wherein a first electrical connection end XL of the two electrical connection ends on the first conducting layer panel is connected to the positive voltage, and a second electrical connection end XR is connected to ground Vdd; a third electrical connection end YU of the two electrical connection end on the second conducting layer panel is connected to the positive voltage, and a fourth electrical connection end YD is connected to ground Vdd; the first test resistor Rx is connected in series between the second electrical connection end XR and the first test point of the second electrical connection end XR, the second test resistor Ry is connected in series between the fourth electrical connection end YD and the second test point of the fourth electrical connection end YD;
   or, the first electrical connection end XL of the two electrical connection ends on the first conducting layer panel is connected to ground Vdd, while the second electrical connection end XR is connected to the positive voltage; the third electrical connection end YU of the two electrical connection ends on the second conducting layer panel is connected to ground Vdd, while the fourth electric connection end YD is connected to positive voltage; the first test resistor Rx is connected in series between the first electrical connection end XL and the third test point of the first electrical connection end XL, the second test resistor Ry is connected in series between the third electrical connection end YU and the fourth test point of the third electrical connection end YU;
   the second identifying unit includes:
   an identifying subunit used for identifying the magnitude change trend of the first voltage value Vadcx and the second voltage value Vadcy during the double-point touching process; and
   a second determining subunit used for obtaining the identification results of the identifying subunit, if both the first voltage value Vadcx and the second voltage value Vadcy appear no effective trend, it identifies the operation gesture of the double-point touching is the gesture with no relative motion between double-point; if the first voltage value Vadcx appears an effective increasing trend while the second voltage value Vadcy appears no effective trend, or the first voltage value Vadcx appears no effective trend while the second voltage value Vadcy appears an effective increasing trend during the double-point touching process, determining that the operation gesture of the double-point touching is the gesture for magnifying; if the first voltage value Vadcx appears an effective decreasing trend while the second voltage value Vadcy appears no effective trend, or the first voltage value Vadcx appears no effective trend while the second voltage value Vadcy appears an effective decreasing trend during the double-point touching process, determining that the operation gesture of the double-point touching is the gesture for shrinking; if the first voltage value Vadcx appears an effective increasing or decreasing trend and the second voltage value Vadcy appears an effective increasing or decreasing trend during the double-point touching process, determining that the operation gesture of the double-point touching is the gesture for rotation.

18. The device of claim 17, further comprising:
a second obtaining unit used for obtaining the movement track of the mid point between the double-point during the process of double-point touching;
a third identifying unit used for identifying that the direction of the rotation gesture appeared by the double-point is clockwise or counterclockwise according to the effective trend of the first voltage value Vadcx and the second voltage value Vadcy and the movement track information of the mid point between the double-point.

19. The device of claim 18, wherein the first obtaining unit analyzes the magnitude relationship between the first voltage Vadcx and the first reference voltage value Vadcx_ref and the magnitude relationship between the second voltage value Vadcy and the second reference voltage value Vadcy_ref of each sampling point in the preconfigured analysis step;
the first identifying unit analyzes the status of the resistive touch screen to identify whether it is single-point touching or double-point touching in each preconfigured analysis step respectively;
the second identifying unit identifies the magnitude change trend of the first voltage value Vadcx and the second voltage value Vadcy in each preconfigured analysis step; and identifies the operation gesture of the double-point touching and outputs according to the trend of the first voltage value Vadcx and the second voltage value Vadcy in each preconfigured analysis step.

20. The device of claim 19, wherein if the first voltage value Vadcx increases to a preconfigured effective increasing threshold in each sampling point in the preconfigured analysis step, the first voltage value Vadcx appears to be an effective increasing trend; if the first voltage value Vadcx decreases to a preconfigured effective decreasing threshold in each sampling point in the preconfigured analysis step, the first voltage value Vadcx appears to be an effective decreasing trend;
if the second voltage value Vadcy increases to a preconfigured effective increasing threshold in each sampling point in the preconfigured analysis step, the second voltage value Vadcy appears to be an effective increasing trend; if the second voltage value Vadcy decreases to a preconfigured effective decreasing threshold in each sampling point in the preconfigured analysis step, the first voltage value Vadcy appears to be an effective decreasing trend.

21. The device of claim 20, further comprising:
a third obtaining unit used to response to the status of the resistive touch screen when it is single-point touching according to the identification result of the first identifying unit and to obtain the voltage value generated by the touching point of the single-point touching on the first conducting layer panel according to the first voltage value Vadcx and a positive voltage value which is connected to an electrical connection end on the second conducting layer; and it obtains the voltage value generated by the touching point on the second conducting layer panel according to the second voltage value Vadcy and a positive voltage value which is connected to an electrical connection end on the first conducting layer; it further obtains the X position and Y position (x, y) of the touching point in the coordinate system as the position of the touching point on the resistive touch semen according to the voltage value generated by the touching point on the first conducting layer panel and the second conducting layer panel and the width of the screen body in X axis and Y axis.

22. The device of claim 21, further comprising:
an applying and controlling unit used for controlling the screen display of the applications on the resistive touch screen according to the position information of the touching point on the screen body of the resistive touch screen or the operation gesture information of the double-point touching.

23. The device or claim 16, wherein a first electrical connection end XL of the two electrical connection ends on the first conducting layer panel is connected to ground Vdd, while a second electrical connection end XR is connected to the positive voltage; a third electrical connection end YU of the two electrical connection ends on the second conducting layer panel is connected to ground Vdd, a fourth electrical connection end YD is connected to the positive voltage; the first test resistor Rx is connected in series between the second electrical connection end XR and the first test point of the second electrical connection end XR, and the second test resistor Ry is connected in series between the fourth electrical connection end YD and the second test point of the fourth electrical connection end YD;
the first electrical connection end XL of the two electrical connection ends on the first conducting layer panel is connected to the positive voltage, while the second electrical connection end XR is connected to ground Vdd; the third electrical connection end YU of the two electrical connection ends on the second conducting layer panel is connected to the positive voltage, while the fourth electric connection end YD is connected to ground Vdd; the first test resistor Rx is connected in series between the first electrical connection end XL and the third test point of the first electrical connection end XL, the second test resistor Ry is connected in series between the third electrical connection end YU and the fourth test point of the third electrical connection end YU;
the second identifying unit comprises:
an identifying subunit used for identifying the magnitude change trend of the first voltage value Vadcx and the second voltage Vadcy during the double-point touching process; and
a second determining subunit used for obtaining the identification results of the identifying subunit, if both the first voltage value Vadcx and the second voltage value Vadcy appear no effective trend, it identifies the operation gesture of the double-point touching is the gesture with no relative motion between double-point; if the first voltage value Vadcx appears an effective increasing trend while the second voltage value Vadcy appears no effective trend, or the first voltage value Vadcx appears no effective trend while the second voltage value Vadcy appears an effective increasing trend during the double-point touching process, it identifies the operation gesture of the double-point touching is the gesture for shrinking; if the first voltage value Vadcx appears an effective decreasing trend while the second voltage value Vadcy appears no effective trend, or the first voltage value Vadcx appears no effective trend while the second voltage value Vadcy appears an effective decreasing trend during the double-point touching process, it identifies the operation gesture of double-point touching is the gesture for magnifying; if the first voltage value Vadcx appears an effective increasing or decreasing trend and the second voltage value Vadcy appears an effective increasing or decreasing trend during the double-point touching process, it identifies the operation gesture of double-point touching is the gesture for rotation.

24. The device of claim 15, wherein the first identifying unit further comprises:
   an obtaining subunit used for obtaining the absolute value of the difference between the first voltage value Vadcx and the first reference voltage value Vadcx_ref and identifying whether the absolute value is larger than a first preconfigured threshold value Vadcx_t, and obtaining the absolute value of the difference between the second voltage value Vadcy and the second reference voltage value Vadcy_ref and identifying whether the absolute value is larger than a second preconfigured threshold value Vadcy_t;
   a first determining subunit used to obtaining to the identification results of obtaining subunit, if the absolute value of the difference between the first voltage value Vadcx and the first reference voltage value Vadcx_ref is larger than the first threshold value Vadcx_t, and/or if the absolute value of the difference between the second voltage value Vadcy and the second reference voltage value Vadcy_ref is greater than the preconfigured threshold value Vadcy_t, it identifies the status of the resistive touch screen is double-point touching; otherwise, if the absolute value of the difference between the first voltage value Vadcx and the first reference voltage value Vadcx_ref is not larger than the first threshold value Vadcx_t, and/or if the absolute value of the difference between the second voltage value Vadcy and the second reference voltage value Vadcy_ref is not greater than the preconfigured threshold value Vadcy_t, it identifies the status of the resistive touch screen is single-point touching.

25. A resistive touch screen, the screen body of the resistive touch screen includes a first conducting layer panel and a second layer panel; two electrical connection ends on the first conducting layer panel form the X axis of a coordinates which sets on the surface screen of the resistive touch screen, and two electrical connection ends on the second conducting layer panel form the Y axis of the coordinates; wherein a first test resistor Rx is connected in series on the X axis, and a second test resistor Ry is connected in series on the Y axis; the resistive touch screen includes the double-point detection device of the resistive touch screen in claim 13.

* * * * *